(12) United States Patent
Kim

(10) Patent No.: US 12,403,915 B2
(45) Date of Patent: Sep. 2, 2025

(54) ADVANCED DRIVER ASSISTANCE SYSTEMS AND A VEHICLE HAVING THE SAME

(71) Applicants: HYUNDAI MOTOR COMPANY, Seoul (KR); KIA CORPORATION, Seoul (KR)

(72) Inventor: Jungwan Kim, Yongin-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 185 days.

(21) Appl. No.: 18/370,257

(22) Filed: Sep. 19, 2023

(65) Prior Publication Data

US 2024/0208513 A1 Jun. 27, 2024

(30) Foreign Application Priority Data

Dec. 23, 2022 (KR) .................... 10-2022-0183550

(51) Int. Cl.
  *B60W 40/13* (2012.01)
  *B60W 40/08* (2012.01)
(52) U.S. Cl.
  CPC .......... *B60W 40/13* (2013.01); *B60W 40/08* (2013.01); *B60W 2040/0881* (2013.01); *B60W 2040/1315* (2013.01)
(58) Field of Classification Search
  CPC ............. B60W 40/13; B60W 40/08; B60W 2040/0881; B60W 2040/1315;
  (Continued)

(56) References Cited

U.S. PATENT DOCUMENTS 11,092,963 B2  8/2021 Wei et al.
12,139,129 B2 * 11/2024 Suh ................ B60W 10/18
(Continued)

FOREIGN PATENT DOCUMENTS

CN   110281892 B     7/2021
CN   114604258 A  *  6/2022
(Continued)

OTHER PUBLICATIONS

KR-20240154733-A translation (Year: 2024).*
(Continued)

*Primary Examiner* — Kyle T Johnson
(74) *Attorney, Agent, or Firm* — Lempia Summerfield Katz LLC

(57) ABSTRACT

A vehicle includes a front wheel and a rear wheel, a first weight sensor for detecting an axle weight of the front wheel, a second weight sensor for detecting an axle weight of the rear wheel, and an acceleration sensor for detecting a deceleration of the vehicle. The vehicle further includes a memory for storing a weight value of the vehicle and an inter-axle distance value of the vehicle and a processor configured to control driving of the vehicle and, when braking during driving, to obtain a value of a center of gravity point based on the detected weight values, the deceleration, and inter-axle distance of the vehicle. The processor is configured to control the deceleration based on the obtained value of the center of gravity point. The vehicle includes a braking device for performing braking in response to a control command of the processor.

20 Claims, 15 Drawing Sheets

(58) Field of Classification Search
CPC ....... B60W 30/18109; B60W 60/0016; B60W 2050/0026; B60W 2720/106; B60W 2040/1307; B60W 2300/10; B60W 2520/105; B60W 2530/10; B60W 2530/201; B60W 40/105; B60W 40/107; B60W 2050/0005; B60W 2420/403; B60W 2520/04; B60W 2720/10; B60W 2756/10; B60Y 2400/30

See application file for complete search history.

(56) References Cited

U.S. PATENT DOCUMENTS

| | | | | |
|---|---|---|---|---|
| 12,145,559 | B2* | 11/2024 | Kim | B60W 40/13 |
| 2003/0085562 | A1* | 5/2003 | Sparling | B60G 5/00 |
| | | | | 280/789 |
| 2013/0132025 | A1* | 5/2013 | Watanabe | G01M 1/10 |
| | | | | 702/150 |
| 2017/0050685 | A1* | 2/2017 | Seo | B62D 37/04 |
| 2020/0289883 | A1* | 9/2020 | Kikuchi | A63B 24/0021 |
| 2021/0107421 | A1* | 4/2021 | Uno | B60W 40/08 |
| 2022/0063597 | A1* | 3/2022 | Narita | B60Q 3/70 |
| 2022/0063619 | A1* | 3/2022 | Maniwa | B60W 30/182 |
| 2023/0009196 | A1* | 1/2023 | Kim | B60T 8/1766 |
| 2024/0208513 | A1* | 6/2024 | Kim | B60W 40/13 |

FOREIGN PATENT DOCUMENTS

| | | | | |
|---|---|---|---|---|
| DE | 102014001031 | A1 * | 7/2015 | ............ B60W 40/13 |
| EP | 3782839 | A1 * | 2/2021 | ............. B60K 28/02 |
| JP | 6962280 | B2 * | 11/2021 | ........ B60R 21/01534 |
| KR | 20150128046 | A  * | 11/2015 | |
| KR | 101709177 | B1 | 2/2017 | |
| KR | 102200803 | B1 | 1/2021 | |
| KR | 102219366 | B1 | 2/2021 | |
| KR | 102353121 | B1 | 1/2022 | |
| KR | 20240154733 | A  * | 10/2024 | |

OTHER PUBLICATIONS

DE-102014001031-A1 translation (Year: 2015).*
CN-114604258-A translation (Year: 2022).*
KR-20150128046-A translation (Year: 2015).*
JP-6962280-B2 translation (Year: 2021).*
Monitoring the center of gravity of a vehicle seat to detect occupant position (Year: 2024).*

* cited by examiner

ADVANCED DRIVER ASSISTANCE SYSTEMS AND A VEHICLE HAVING THE SAME

CROSS-REFERENCE TO RELATED APPLICATION

The present application claims priority to and the benefit of Korean Patent Application No. 10-2022-0183550, filed on Dec. 23, 2022, the disclosure of which is incorporated by reference in its entirety.

TECHNICAL FIELD

The disclosure relates to a driver assistance device that controls autonomous driving of a vehicle based on an occupancy status of a passenger and relates to a vehicle having the same.

BACKGROUND

Vehicles may be categorized as passenger vehicles, which are used for personal use and transportation, and as commercial vehicles, which are used for commercial use and transportation of goods or people.

Commercial vehicles may include trucks, dump trucks, vans, forklifts, and specialty vehicles that transport goods. Commercial vehicles may further include buses and taxis that transport people.

In recent years, various advanced driver assistance systems (ADAS) have been developed to provide the driver with information about the vehicle's operation and guidance information for the driver's convenience in order to prevent accidents caused by driver inattention.

Examples of driver assistance systems include: Lane Departure Warning (LDW) technology, which recognizes lanes and issues an alarm in response to driving outside the recognized lane; Lane Following Assist (LFA) technology, which recognizes lanes and controls the steering to drive in the lane based on the location information of the recognized lane; and autonomous driving technology, which autonomously drives to a destination based on lane location information, road information, and current location information while detecting obstacles and avoiding obstacles.

The driver assistance technologies are also being implemented in commercial vehicles such as buses.

Currently, driver assistance technologies are being developed for buses based on the assumption that passengers are standing in the bus.

However, there may be standing passengers inside the bus. In this case, if an accident occurs or the bus brakes suddenly while both seated and standing passengers are present, the standing passengers will be in a more dangerous situation than the standing passengers.

SUMMARY

In view of the foregoing, there is currently a need for driver assistance technologies that may ensure the safety of both sitting and standing passengers in commercial vehicles such as buses. To this end, embodiments of the present disclosure provide a driver assistance device and a vehicle having the driver assistance device. The driver assistance device obtains a rate of change using the height of a center of gravity based on a weight difference between the front and the rear of the vehicle that occurs during braking, i.e., while applying the brake pedal of the vehicle. The driver assistance device further obtains a presence and percentage of passengers in a standing state, i.e., passengers that are standing, based on the obtained rate of change in the center of gravity. The driver assistance device controls stopping, or deceleration of the vehicle based on the obtained presence and percentage of passengers in a standing state.

A driver assistance device according to an embodiment, includes a communication unit for receiving a first weight value of a front wheel axle of the vehicle, a second weight value of a rear wheel axle of the vehicle, and a deceleration value. The driver assistance device further includes a memory for storing a weight value of the vehicle and an inter-axle distance value of the vehicle. The driver assistance device further includes a processor that obtains or is configured to obtain, when braking, a value of a center of gravity point based on the stored weight value of the vehicle, the inter-axle distance value, the received first weight value, the received second weight value, the received deceleration value, and a preset gravitational acceleration value. The processor further determines or is configured to determine whether a standing passenger exists based on the obtained value of the center of gravity point. The processor further controls or is configured to control a deceleration rate when it is determined that a standing passenger exists, i.e., the standing passenger is present in the vehicle.

The memory of the driver assistance device, according to an embodiment, stores a first table, e.g., a first data structure, of values of the reference center of gravity corresponding to each of the total weight values of the vehicle. The processor of the driver assistance device according to an aspect of the present disclosure, obtains a total weight value of the vehicle based on the received first weight value, the received second weight value, and the stored weight value of the vehicle. The processor further determines whether a value of the reference center of gravity of the first table of values corresponds to the obtained total weight value of the vehicle. The processor further determines whether a standing passenger is present in the vehicle based on a difference between the determined value of the reference center of gravity and the obtained value of the reference center of gravity.

The processor of the driver assistance device, according to an embodiment, determines an error value between the determined value of the reference center of gravity and the obtained value of the center of gravity, and determines that a standing passenger is present if the error value is outside a standard error range.

The memory of the driver assistance device, according to an embodiment, stores the first factor corresponding to each of the deceleration values in a second table. The processor of the driver assistance device, according to an aspect of the present disclosure, checks the first factor corresponding to the deceleration values received from the second table and corrects or calibrates the determined error value based on the checked first factor.

The memory of the driver assistance device, according to an embodiment, stores a safety degree corresponding to each of the error values of the center of gravity in a third table, and stores a second factor corresponding to the safety degree in a fourth table.

The processor of the driver assistance device, according to an embodiment, determines a safety degree corresponding to the error value determined from the third table, determines a second factor corresponding to the safety degree from the fourth table, and obtains a deceleration limit value based on the determined second factor and a preset maximum deceleration limit value. The processor further controls deceleration based on the obtained deceleration limit value.

In an embodiment, the processor of the driver assistance device obtains a change rate at which the obtained error value changes over a preset time period. The processor further determines a likelihood of a fall accident occurring by comparing the obtained change rate with a reference change rate range.

The processor of the driver assistance device, according to an embodiment, determines that a possibility of a falling accident exists when the obtained rate of change is outside of the range of the reference rate of change. The processor further controls a stop of the vehicle.

The processor of the driver assistance device, according to an embodiment, controls a communicator to transmit the acquired deceleration limit value and the acquired center of gravity error value to a server when it is determined that a possibility of a fall accident exists.

The communicator of the driver assistance device, according to an embodiment, receives sensing information from an image sensor provided in the interior. The processor of the driver assistance device, according to an aspect of the present disclosure, determines, based on the sensing information, whether a fall has occurred.

A vehicle, according to another embodiment, includes a front wheel and a rear wheel, a first weight sensor for detecting an axle weight of the front wheel, a second weight sensor for detecting an axle weight of the rear wheel, and an acceleration sensor for detecting a deceleration. The vehicle further includes a memory for storing a weight value of the vehicle and an inter-axle distance value of the vehicle. The vehicle further includes a processor for controlling autonomous driving, and for obtaining a value of a center of gravity point based on the stored weight value of the vehicle, an inter-axle distance value, a first weight value detected by the first weight sensor, a second weight value detected by the first weight sensor, a deceleration value detected by the acceleration sensor, and a preset gravitational acceleration value when braking during autonomous driving. The processor further controls or is configured to control the deceleration based on the obtained value of the center of gravity point. The vehicle further includes a braking device for performing braking. Specifically, the braking device is configured to perform braking in response to a control command from the processor.

The memory of the vehicle, according to another embodiment, stores a first table of values of the reference center of gravity corresponding to values of the total weight of the vehicle. The processor of the vehicle, according to another aspect of the present disclosure, obtains a total weight value of the vehicle based on the received first weight value, the received second weight value, and the stored weight value of the vehicle. The processor of the vehicle further determines whether the information of the vehicle obtained from the first table includes data indicative of the presence of a standing passenger in the vehicle based on a difference between the determined value of the stored values of the reference center of gravity and the obtained value of the center of gravity.

The processor of the vehicle, according to another embodiment, determines an error value between the determined reference center of gravity value and the obtained center of gravity value. The processor of the vehicle further determines that a standing passenger is present in the vehicle if the determined error value is outside of a standard error range.

The memory of the vehicle, according to another embodiment, stores a second table, e.g., a second data structure, including data indicative of first factors corresponding to each of the deceleration values. The processor of the vehicle, according to another aspect, checks the first factor corresponding to the deceleration value received from the second table and corrects the determined error value based on the checked first factor.

The memory of the vehicle, according to another aspect, stores the safety degrees corresponding to the error values of the center of gravity in a third table, e.g., a third data structure, and the second factors corresponding to the safety degrees in a fourth table, e.g., a fourth data structure. The processor of the vehicle according to another aspect determines a safety degree corresponding to the error value determined from the third table, determines a second factor corresponding to the safety degree from the fourth table, obtains a deceleration limit value based on the determined second factor and a preset maximum deceleration limit value. The processor of the vehicle controls deceleration based on the obtained deceleration limit value.

In another embodiment, the processor of the vehicle performs unrestricted deceleration if the confirmed error value is within a reference error range.

In another embodiment, the processor of the vehicle obtains a rate of change in which the obtained error value changes over a preset time period. The processor of the vehicle further determines the likelihood of a falling accident occurring by comparing the obtained rate of change with a reference rate of change range.

In another embodiment, the processor of the vehicle determines that a probability of a fall accident exists when the obtained rate of change is outside of the range of the reference rate of change. The processor further controls a stop of the vehicle. In other words, the processor controls the vehicle by causing the vehicle to stop.

The vehicle, according to other embodiments, further comprises a communicator in communication with a server. The communicator may be implemented by the processor. The processor of the vehicle, according to another aspect, controls the communicator to transmit the acquired deceleration limit value and the acquired center of gravity error value to the server when it is determined that a possibility of a fall accident exists.

The processor of the vehicle, according to another aspect, updates the values of the reference center of gravity corresponding to the total weight values of the vehicle, the first factor corresponding to the deceleration values, the safety degrees corresponding to the error values of the center of gravity, and the second factor corresponding to the safety degrees based on big data received from the server.

The vehicle, according to another embodiment, further comprises an image sensor arranged in the interior of the vehicle. The processor of the vehicle, according to another aspect, further monitors the passengers of the interior based on sensing information acquired by the image sensor when it is determined that a potential for a fall accident exists.

DRAWINGS

In order that the disclosure may be well understood, various forms thereof are described herein, given by way of example, reference being made to the accompanying drawings.

Figure 5:
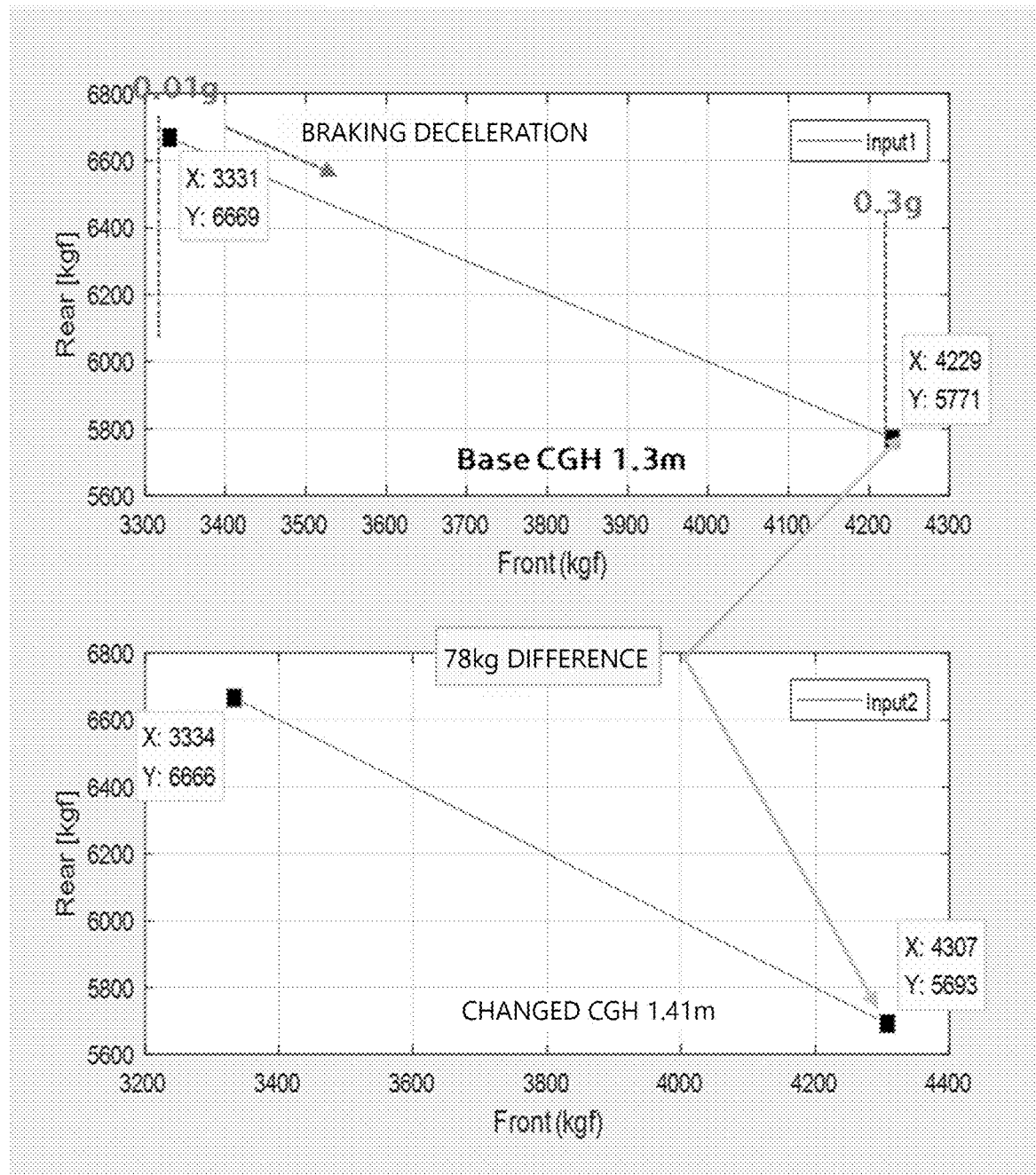

FIG. 5 includes first graphs of a weight value of a front wheel and a weight value of a rear wheel by total weight of a vehicle according to an embodiment.

Figure 6:
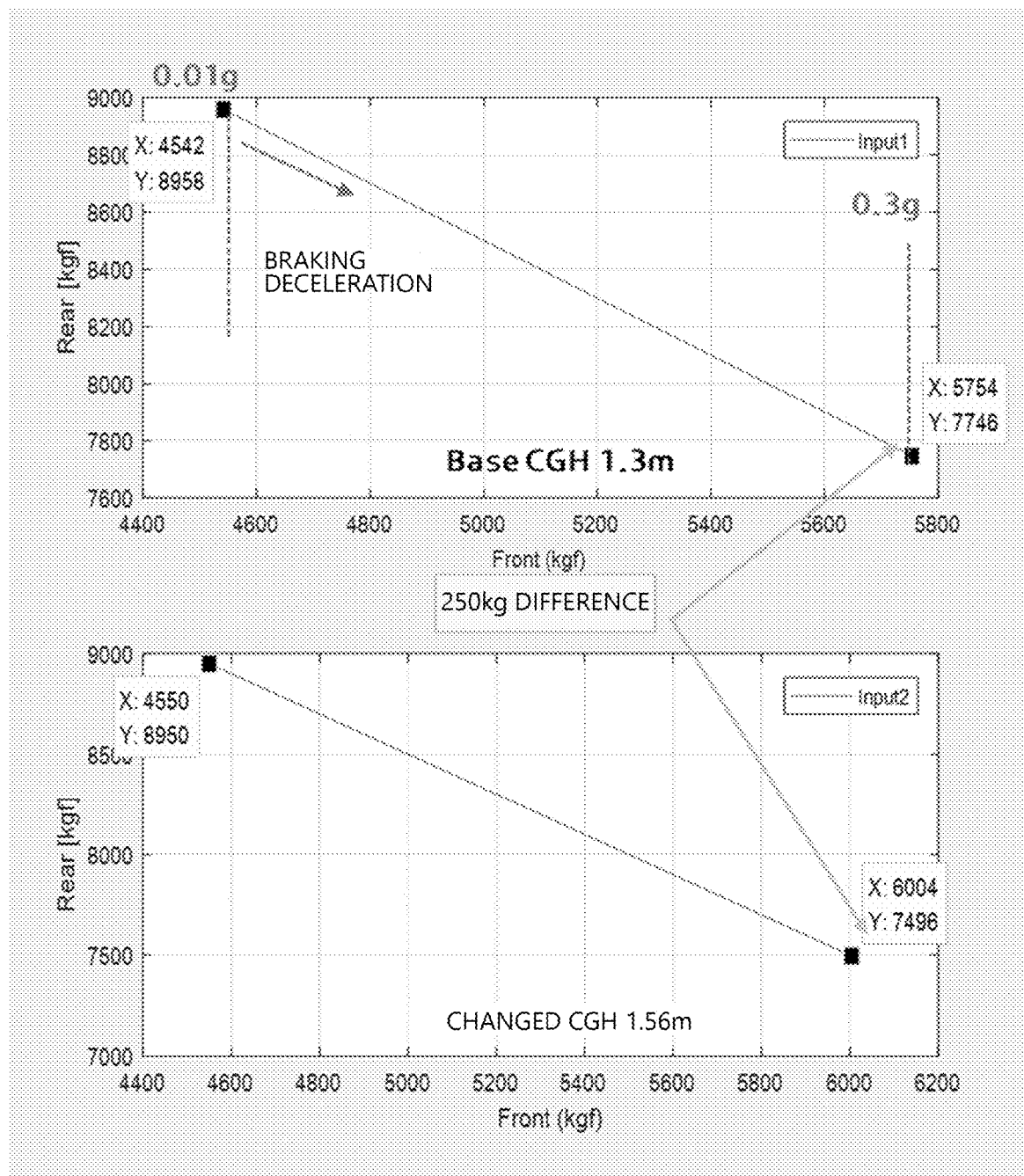

FIG. 6 includes second graphs of a weight value of a front wheel and a weight value of a rear wheel per total weight of a vehicle according to an embodiment.

Figure 7:
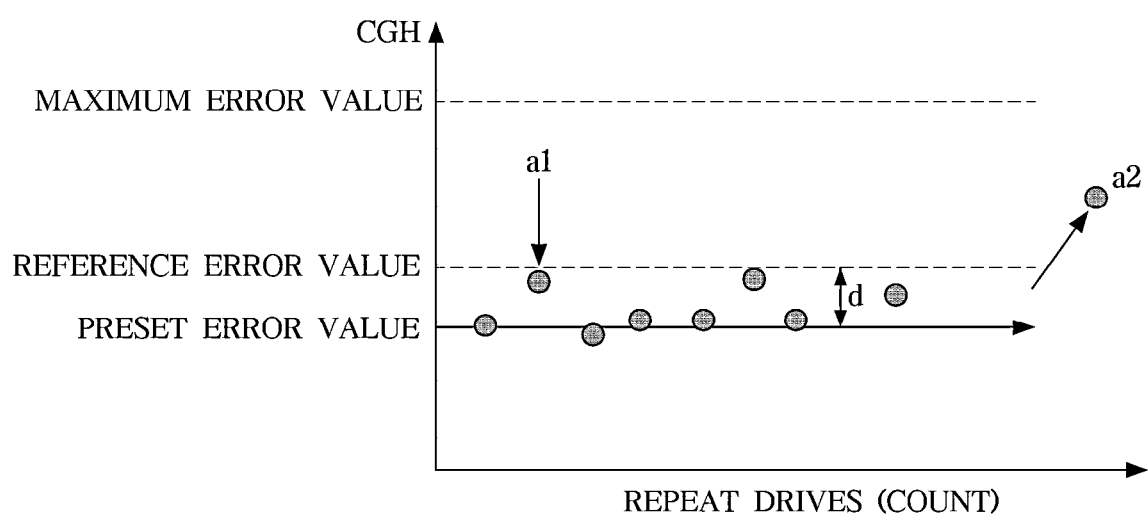

FIG. 7 is a graph of the error value of the center of gravity corresponding to the number of trips of the vehicle according to an embodiment.

Figure 8:
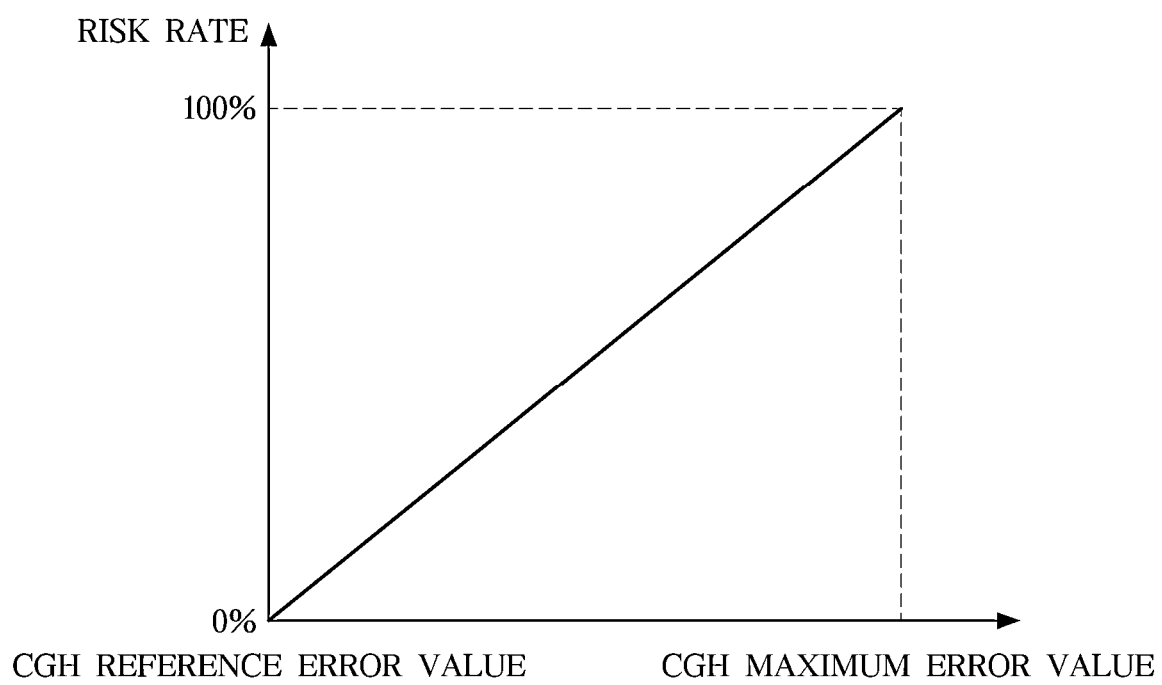

FIG. 8 is a graph of a risk level corresponding to an error value of a center of gravity of a vehicle according to an embodiment.

Figure 9:
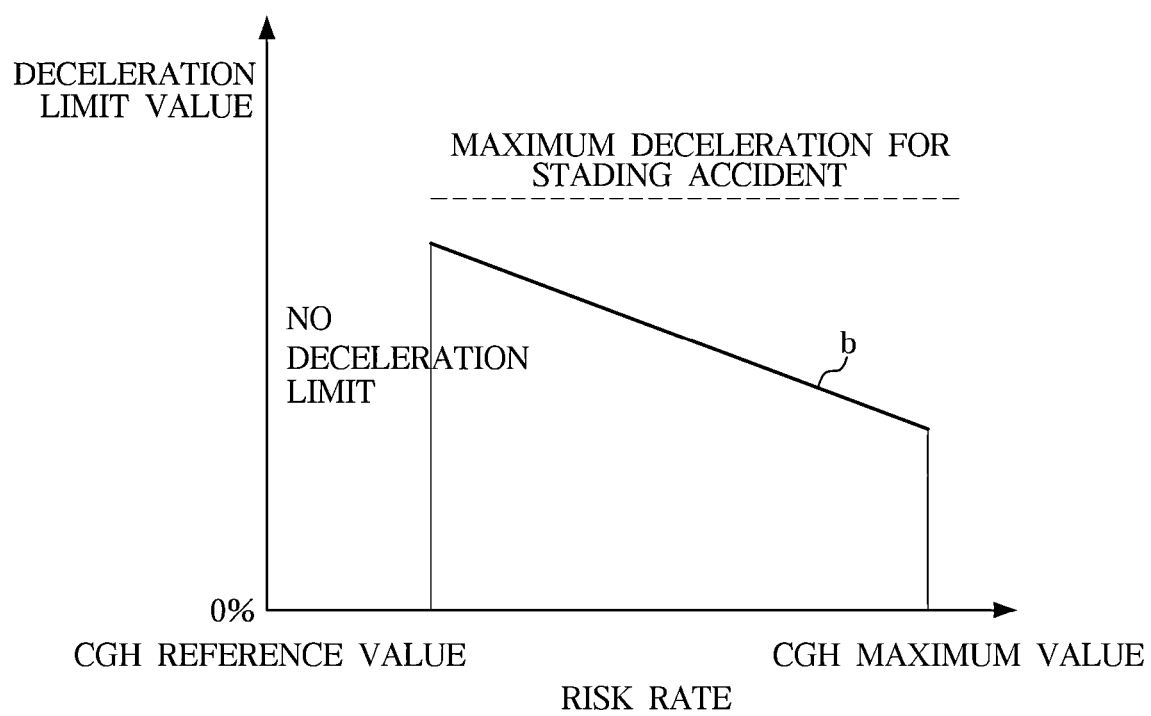

FIG. 9 is a graph of a deceleration limit value corresponding to a risk level of a vehicle according to an embodiment.

Figure 10:
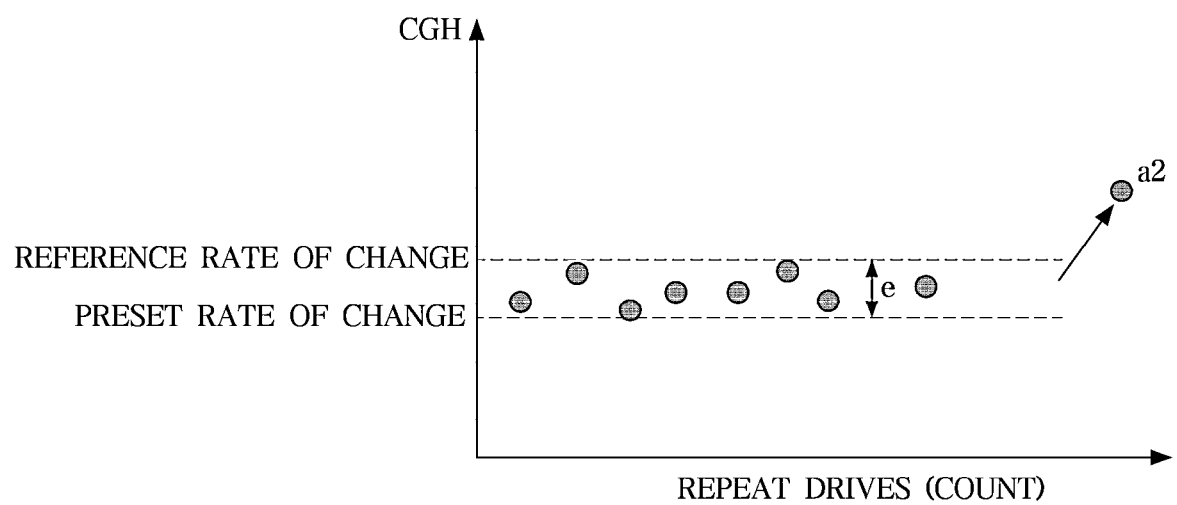

FIG. 10 is a graph of a rate of change corresponding to the number of trips of a vehicle according to an embodiment.

Figure 11:
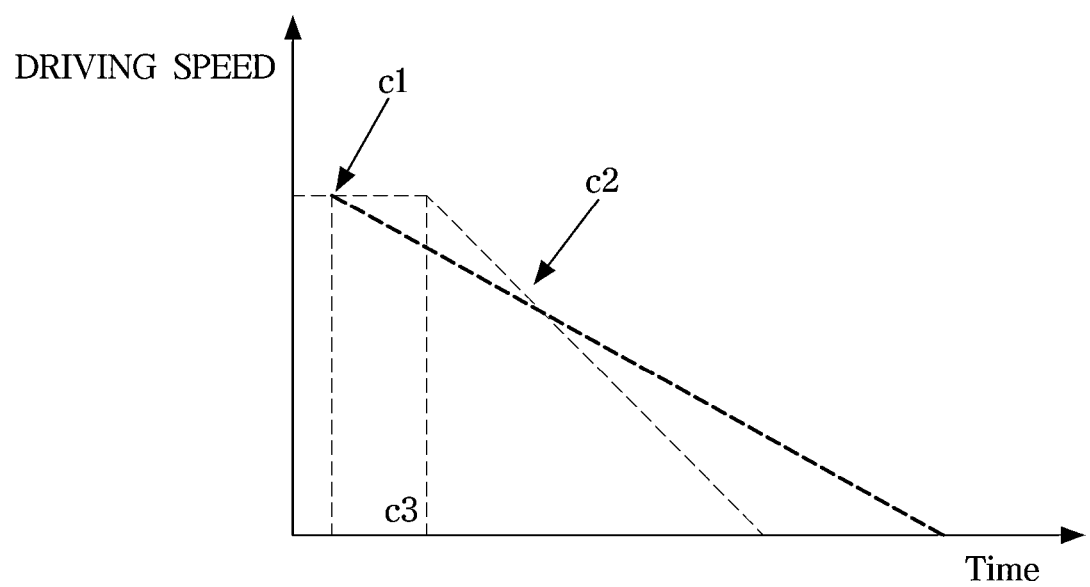

FIG. 11 is a graph of the maximum deceleration limit value of the electronic brake control unit and the maximum deceleration limit value of the driver assistance device when the maximum deceleration limit value of the electronic brake control unit and the maximum deceleration limit value of the driver assistance device are different, according to an embodiment.

Figure 12A:
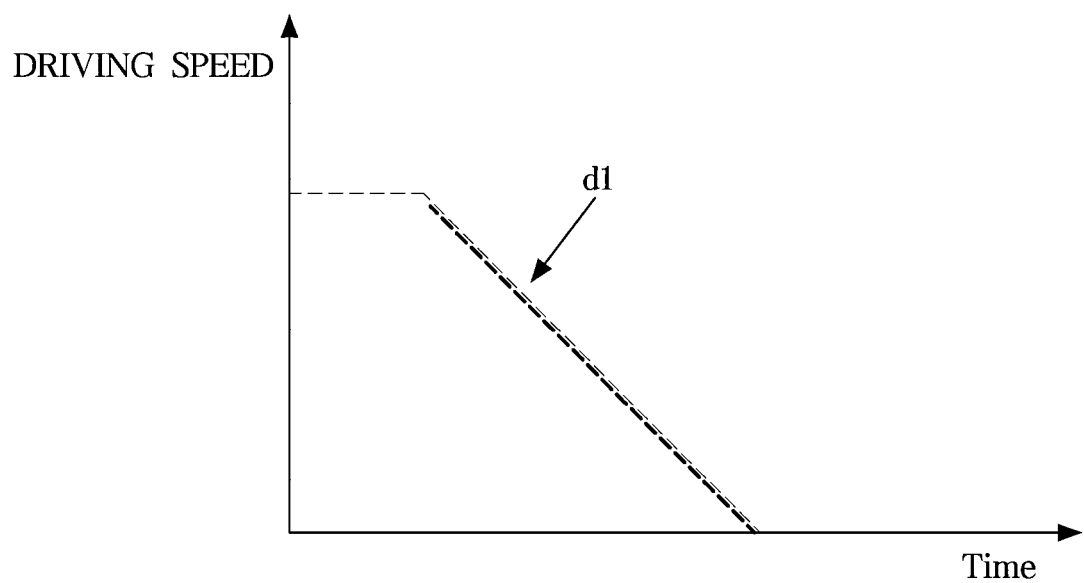
Figure 12B:
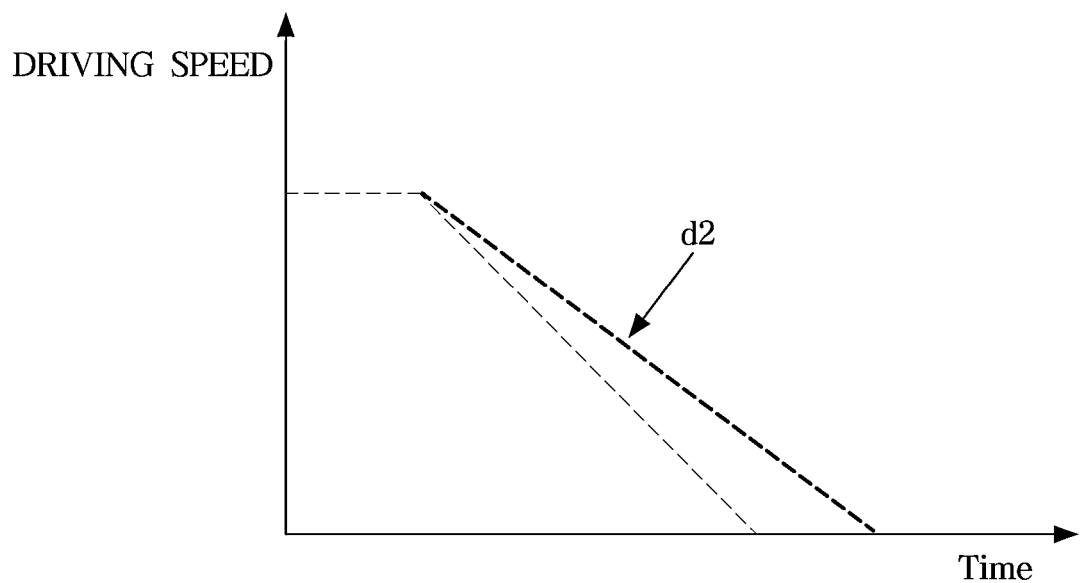

FIGS. 12A and 12B are graphs of a maximum deceleration limit value of the electronic brake control unit and a maximum deceleration limit value of the driver assistance device when the maximum deceleration limit value of the electronic brake control unit of a vehicle, according to an embodiment, is less than the maximum deceleration limit value of the driver assistance device.

Figure 13:
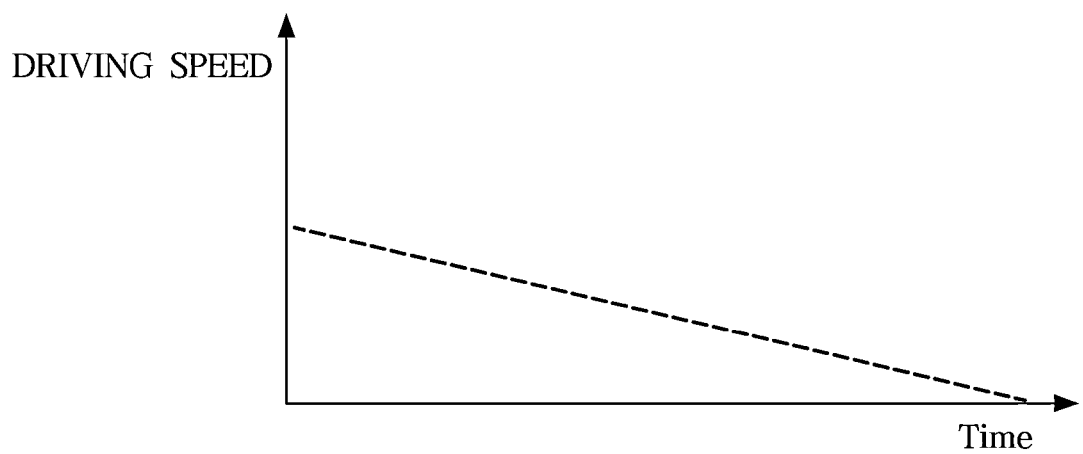

FIG. 13 is a graph of a deceleration limit value when a vehicle stops according to an embodiment.

Figure 14:
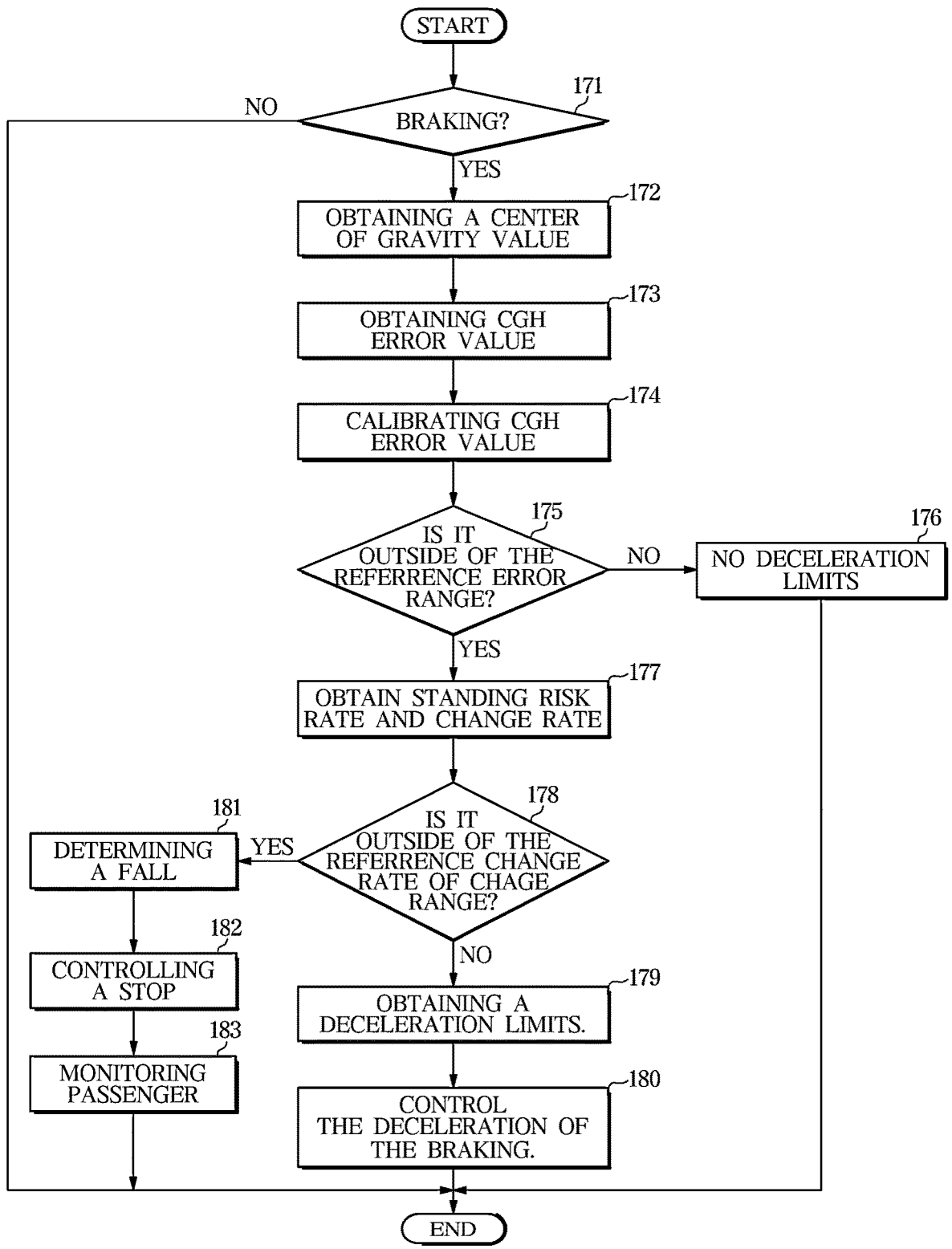

FIG. 14 is a control flowchart of a vehicle according to an embodiment.

DETAILED DESCRIPTION

Throughout the specification, like reference numerals refer to like components. The specification does not describe all elements of the embodiments and omits what is common in the field of technology to which the present embodiment belongs or what is redundant between embodiments. As used herein, the term "apparatus" may be implemented in software or hardware, and in some embodiments, a plurality of "apparatus" may be implemented as a single component, or a single "apparatus" may comprise a plurality of components.

Further, when an element in the written description and claims is described as being "for" performing or carrying out a stated function, step, set of instructions, or the like, the element may also be considered as being "configured to" do so.

Throughout the specification, when a part is to be "connected" to another part, this includes direct connections as well as indirect connections. Indirect connections include connections via a wireless communication network.

Also, it is to be understood that the terms "include" and "have" and variations thereof are intended to indicate the existence of components or elements in the specification and are not intended to preclude or to exclude the possibility that one or more other components or elements may exist or may be added, unless specifically stated to the contrary.

Throughout the specification, when a component is to be or is located "on" another component, this includes not only when a component abuts, e.g., is in contact with, another component, but also when there is another component present between the two components.

Further, terms such as obstacles "in front", "ahead", "around", "close", and the like include obstacles in relatively close proximity to a vehicle, or the like.

Throughout the specification, the term "risk" refers to the risk of a passenger or occupant to fall or to have a falling accident when the passenger is standing in the vehicle.

The terms first, second, third, and the like are used to distinguish one component from another, and the components are not limited by the foregoing terms.

The singular expression includes the plural expression unless the context clearly indicates otherwise.

The identification of each step is for convenience of description only. The identification of each step does not describe the order of the steps. In other words, the steps may be performed in any order other than that specified unless the context clearly indicates a particular order.

The principles of operation and embodiments of the present embodiment are described below with reference to the accompanying drawings.

Figure 1:
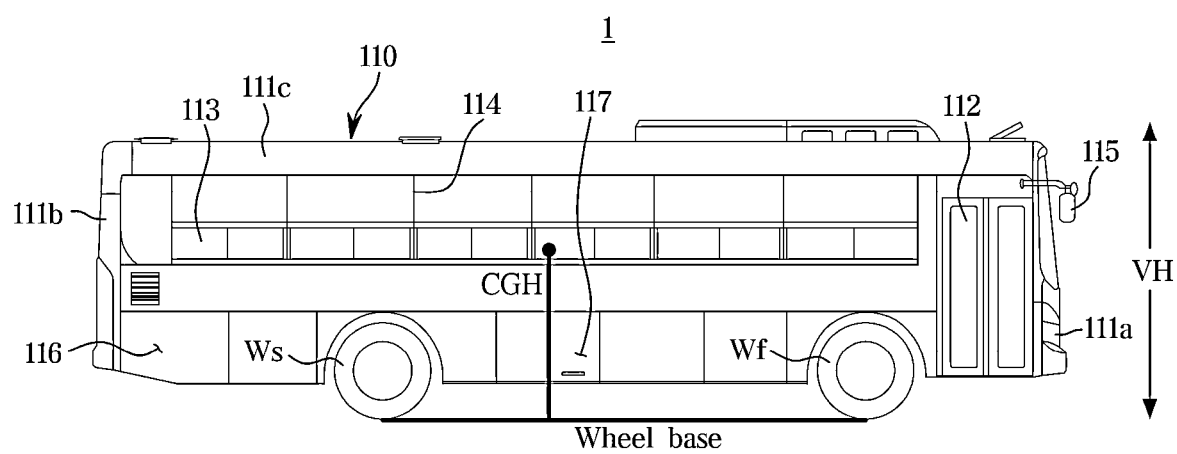
FIG. 1 is an exterior illustration of a bus according to an embodiment.
Figure 2:
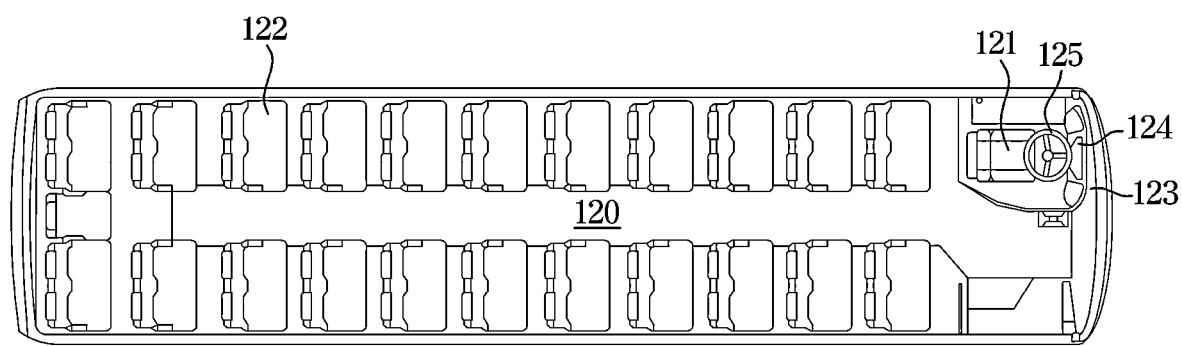
FIG. 2 is an interior illustration of a bus according to an embodiment.

FIG. 1 is an exterior view of a vehicle 1 according to an embodiment. FIG. 2 is an interior view of the vehicle 1 according to an embodiment. The vehicle 1 of this embodiment may be a bus that may carry more people than a passenger car.

The vehicle 1 includes a body having an interior, an exterior, and a chassis on which mechanical devices necessary for driving are installed.

As shown in FIG. 1, the exterior of the body 110 includes a frame that forms a skeleton and supports the load of the body. The exterior of the body 110 further includes panels 111 that surround the exterior of the frame. The panels 111 include a front panel 111a, a rear panel 111b, a roof panel 111c, and side panels 111d.

The exterior of the vehicle 1 includes a door 112 disposed between the front panel 111a and the side panel 111d. The door 112 forms a passageway for a person(s) to get in and out of the vehicle. It is also possible that the door 112 is further provided in a side panel at the rear of the vehicle.

The exterior 110 of the vehicle 1 further includes window glasses 113 disposed in the door 112, the front panel 111a, and the side panel 111d, respectively. The exterior of the vehicle further includes fillers 114 respectively disposed in the boundaries between the window glasses 113.

The exterior of the body 110 of the vehicle 1 may further include side mirrors 115 that provide the driver with a view of the rear of the vehicle 1.

If the vehicle 1 is an electric vehicle, the body of the electric vehicle may be provided with a mechanical compartment 116 in which a battery, a battery cooling system and an air conditioning system are arranged. The body of the electric vehicle may further include a cargo compartment 117 in which cargo is carried. The mechanical compartment 116 and the cargo compartment 117 may be able to be opened by separate doors.

An air conditioning unit may be arranged in the upper of the body and the lower of the roof panel.

The battery, battery management unit, and battery cooling unit may be provided on the upper section of the body of the electric vehicle but disposed on the lower section of the roof panel.

The battery, battery management unit, and battery cooling unit may also be provided in a lower section of the body of the electrical vehicle.

The lower section of the vehicle 1 may be provided with a drive motor, a reducer, a power control unit, and a motor control unit to control the wheels when the vehicle 1 is being driven. In this embodiment, the motor control device may include a rectifier, an inverter, and a converter.

The undercarriage of the vehicle 1 may include a power unit, a drive unit, a steering unit, a braking unit, and a suspension unit. The undercarriage of the vehicle may further include a transmission.

As shown in FIG. 2, the interior of the vehicle body 120 may include a driver's seat 121 where the driver sits, a plurality of passenger seats 122 where passengers other than the driver sit, a dashboard 123, and a cluster 124 disposed on the dashboard 123. The dashboard displays vehicle information such as vehicle drive speed, motor speed, battery charge.

The cluster 124 may be digitally implemented. The cluster may display vehicle information and driving information as an image.

The interior of the vehicle may be provided with a steering wheel 125, a brake pedal, and an accelerator pedal that are operated by a user with an intent to drive the vehicle.

The vehicle may further include a terminal capable of performing any of multiple modes including an audio mode, a video mode, a navigation mode, a digital multimedia broadcasting (DMB) mode, and a radio mode. The terminal may be further capable of displaying a map including a map extent, route information, and directions when in navigation mode.

The terminal may include a display panel. The terminal may include a touch screen with a touch panel integrated into the display panel.

The terminal may display route information, current stop information, and next stop information.

The terminal may store a precision map database.

The precision map database may include a database of maps that includes information about the curvature of each lane and intersection, the type of road, the slope of the road, the location of the road, information about traffic lights and signs, and the like.

Figure 3:
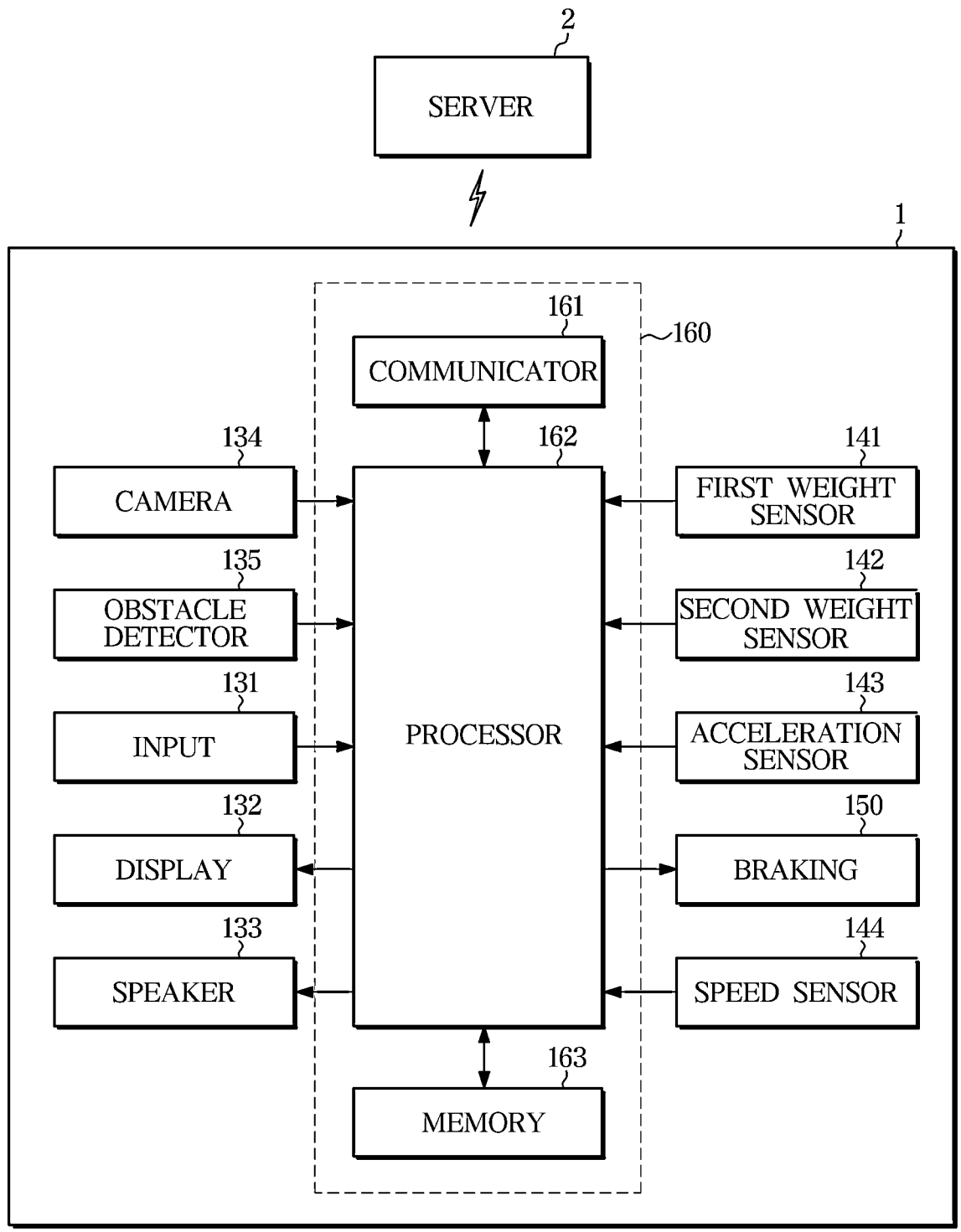
FIG. 3 is a control configuration diagram of a vehicle according to an embodiment.

The terminal may transmit the precision map database to the processor 162, shown in FIG. 3, over Controller Area Network (CAN) communication.

As shown in FIG. 1, the vehicle may include a center of mass and gravity (CGH) that corresponds to the size and weight of the vehicle. This center of mass may vary depending on the number of passengers in the standing position and the number of passengers in the seated position. The number of people may be related to the weight of the passengers.

For example, if all of the passengers are seated, the center of gravity of the passengers will be lower, in which case the height of the base floor of the vehicle, which is about 1 meter high, will reflect the value of the center of gravity of the passengers, resulting in a center of gravity of the vehicle of about 1.3 meters. In this example, the value of the center of gravity may be the height of the center of gravity from the ground.

In this case, the height difference between the value of the center of gravity and the height of the base floor when all passengers are seated is very small.

However, if some of the passengers are standing, the value of the center of gravity of the standing passengers may be about 1 meter and the value of the center of gravity of the vehicle may be about 2 meters, reflecting the height of the base floor. In other words, the height difference between the value of the center of gravity of the vehicle and the height of the base floor becomes larger when standing passengers are present.

Furthermore, the value of the vehicle's center of gravity may vary depending on the percentage of standing passengers.

For example, if the total weight of the vehicle is 11.5 tons and the percentage of standing passengers is 26%, then 1.3 m*74%+2 m*26%=about 1.49 m, which means that the value of the center of gravity is about 19 cm higher.

Since the value of the vehicle's center of gravity changes in response to the number of passengers in a standing state, the vehicle may obtain the value of the center of gravity in real time, determine the risk of standing and the possibility of falling inside the vehicle based on the obtained value of the center of gravity. The vehicle 1 may control the deceleration of the vehicle 1 or control stopping of the vehicle based on the determination.

The vehicle 1 may obtain data indicative of the presence and number of passengers in a standing state based on the difference between the values of the center of gravity and the rate of change of the values of the center of gravity. The vehicle 1 may determine the risk of standing and the possibility of falling based on the presence and number of passengers in a standing state.

The vehicle 1 may store route information and stop information in the memory. The route information may include location information of the route by using a link to a specific location, route, or an area on the map. The stop information may include identification information of the stop and location information of the stop.

The vehicle 1 may control autonomous driving based on the stored route information and the stop information.

The vehicle 1 may obtain standing occupant, i.e., passenger, information corresponding to the route information during autonomous driving and transmit the obtained standing occupant information to a server 2 shown in FIG. 3. The standing occupant information may include information about the presence of standing occupants and the number of standing occupants.

The vehicle 1 may obtain location information within a route where braking deceleration occurs and weight change information between a front wheel and a rear wheel of the vehicle based on an acceleration detected by the acceleration sensor 143 during autonomous driving. The vehicle 1 may further transmit the location information within the obtained route and weight change information between the two wheels to the server 2.

In this embodiment, the location information within the route at which the braking deceleration occurs may include the location information at which a deceleration greater than the reference braking deceleration occurs.

When the braking deceleration occurs, more weight may be detected on the front wheels than on the rear wheels due to a shift of the center of gravity.

The value of the vehicle's center of gravity may be larger the greater the weight difference between the two wheels.

The vehicle 1 may transmit the obtained deceleration value to the server 2 when an accident occurs in which a standing passenger falls.

The vehicle 1 may transmit to the server 2 the rate of change of the error of the value of the center of gravity when there are no standing passengers.

The rate of change of the error of the value of the center of gravity may be used as information for determining the probability of a fall.

The vehicle 1 may drive or may be driven in a manual driving mode in which acceleration, deceleration, and steering information is received by a driver. The driver controls the driving of the vehicle based on the received acceleration, deceleration, and steering information. The vehicle may drive or may be driven in an autonomous driving mode in which the vehicle detects the surrounding environment (e.g., a road, other vehicles, pedestrians, cyclists, lanes, road signs, and the like) and controls at least one of acceleration, deceleration, and steering of the vehicle 1 in response to the detected environment.

In an embodiment, a vehicle may include a bus capable of autonomous driving. The bus capable of autonomous driving is described below.

FIG. 3 is a control configuration diagram of a vehicle according to an embodiment, which is described below with reference to FIGS. 4-13.

Figure 4:
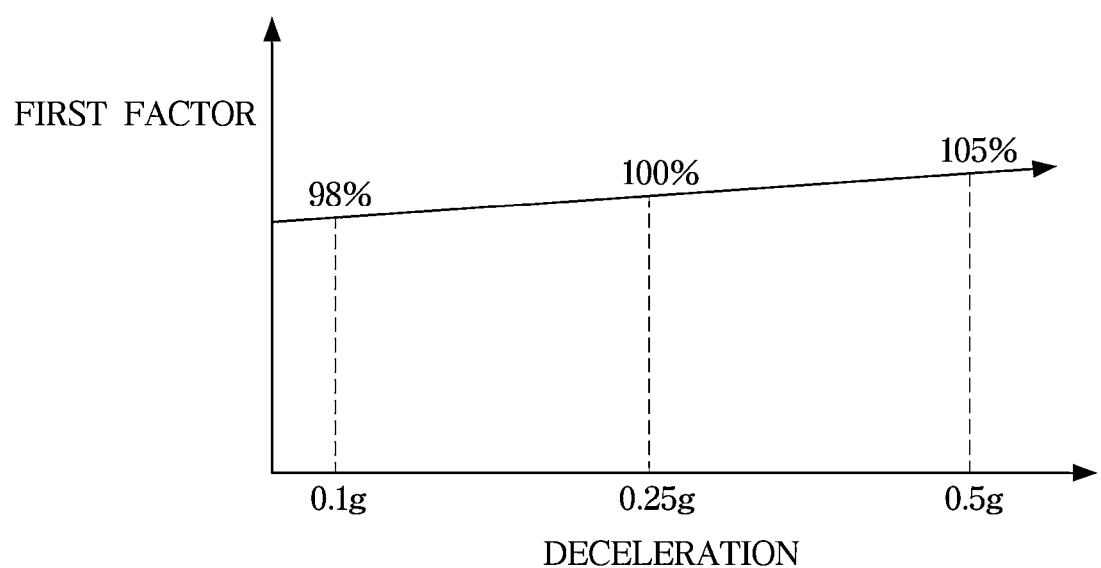
FIG. 4 is a graph of a first factor corresponding to a deceleration of a vehicle according to an embodiment.

FIG. 4 is a graph of a first factor corresponding to a deceleration rate of a vehicle according to an embodiment. FIG. 5 includes first graphs of a weight value of a front wheel and a weight value of a rear wheel by a total weight of a vehicle according to an embodiment. FIG. 6 includes second graphs of a weight value of a front wheel and a weight value of a rear wheel by a total weight of a vehicle according to an embodiment.

FIG. 7 is a graph of an error value of a center of gravity corresponding to a number of trips of a vehicle according to an embodiment. FIG. 8 is a graph of a risk level corresponding to an error value of a center of gravity of a vehicle according to an embodiment. FIG. 9 is a graph of a deceleration limit value corresponding to a risk level of a vehicle according to an embodiment.

FIG. 10 is a graph of a rate of change corresponding to the number of trips of a vehicle according to an embodiment.

FIG. 11 is a graph of the maximum deceleration limit value of the electronic brake control unit and the maximum deceleration limit value of the driver assistance device when the maximum deceleration limit value of the electronic brake control unit and the maximum deceleration limit value of the driver assistance device are different, according to an embodiment.

FIGS. 12A and 12B are graphs of a maximum deceleration limit value of the electronic brake control unit and a maximum deceleration limit value of the driver assistance device when the maximum deceleration limit value of the electronic brake control unit of a vehicle, according to an embodiment, is less than the maximum deceleration limit value of the driver assistance device.

FIG. 13 is a graph of a deceleration limit value when a vehicle stops or is stopped according to an embodiment.

The vehicle 1 may include an input 131, a display 132, a speaker 133, a camera 134, an obstacle detector 135, a first weight sensor 141, a second weight sensor 142, an acceleration sensor 143, a speed sensor 144, a braking 150, and a driver assistance unit 160.

The input 131 receives a user input.

The input 131 may receive an on/off command for a manual driving mode or an autonomous driving mode.

The input 131 may receive route information and stop information.

The input 131 may be provided in the head unit or center fascia of the vehicle 1, or the input 131 may be provided in an in-vehicle terminal (not shown, e.g., an audio video navigation (AVN) device).

The input 131 may include hardware devices such as various buttons or switches, pedals, keyboards, mice, trackballs, levers, handles or sticks, and the like.

The input 131 may also include a graphical user interface (GUI), or software, device, such as a touch pad. The touch pad may be implemented as a touch screen panel (TSP), which may be interlaced with the display 132.

When configured as a touch screen panel (TSP) interlaced with the touch pad, the display 132 may also be used as an input device.

The display 132 may display behavioral information about a function being performed by the vehicle. For example, the display 132 may display information about content, may display information related to music playback, or may display external broadcast information.

The display 132 may display identification information of the vehicle, route information, identification information of a stop, and location information of the stop.

The display 132 may display current location information, distance information from the current location to the next stop, and drive time information.

The display 132 may also display map information that matches the route information and the current location information.

The display 132 may also display information on driving direction information such as the vehicle driving or being driven straight, turning left, turning right, and making a U-turn.

The display 132 may also display hazard warnings and cautionary messages in response to an increase in standing passengers.

The display 132 may include an LED lamp.

The display 132 may include a Cathode Ray Tube (CRT), a Digital Light Processing (DLP) panel, a Plasma Display Penal, a Liquid Crystal Display (LCD) panel, an Electro Luminescence (EL) panel, an Electrophoretic Display: (EPD) panel, Electrochromic Display (ECD) panel, Light Emitting Diode (LED) panel, or Organic Light Emitting Diode (OLED) panel.

The display 132 may be one or more than one displays.

Two or more displays 132 may be provided at different locations in the interior of the vehicle.

The speaker 133 may output sound in response to control commands from the processor 162. The speaker 133 may further output sound at a level corresponding to the control commands from the processor 162.

The speaker 133 may output vehicle information as sound, may output information related to music playback as sound, or may output external broadcast information as sound.

The speaker 133 may periodically output a sound including vehicle identification information, route information, or identification information of the current stop, location information of the current stop, identification information of the next stop, and location information of the next stop.

The speaker 133 may voice the current location information and may also voice the distance information and drive time information from the current location to the next stop.

The speaker 133 may also voice drive direction information such as going straight, turning left, turning right, and making a U-turn.

The speaker 133 may also output hazard announcements and cautionary announcements in response to an increase in standing passengers.

The speaker 133 may be one or more than one.

Two or more speakers 133 may be arranged at different locations in the interior of the vehicle.

The vehicle may include an image sensor.

The image sensor may include a camera 134 and an obstacle detector 135. The image sensor may transmit sensing information to a processor.

The image sensor may include a camera 134 and a Light Detection And Ranging (LiDAR) sensor.

The camera 134 may photograph the surroundings of the vehicle 1 to obtain image information of the surroundings.

There may be one or more cameras 134. The one or more cameras 134 may include a CCD or CMOS image sensor.

The one or more cameras 134 may include a plurality of lenses and image sensors. The image sensor may include a plurality of photodiodes that convert light into electrical signals. The plurality of photodiodes may be arranged in a two-dimensional matrix.

If a single camera 134 is provided, the single camera 134 may be a front camera that acquires an image of the front of the vehicle 1.

The front camera may acquire image information of the front of the vehicle 1. The video information of the front of the vehicle 1 may include geometric information and positional information regarding at least one of a roadway, other vehicles, pedestrians, cyclists, lanes, curbs, guardrails, street trees, and streetlights located in front of the vehicle 1.

If more than one camera is provided, the two or more cameras 134 may include, in addition to the front camera, a rear camera that photographs the rear of the vehicle. The two or more cameras 134 may further include a first side camera that photographs the left side of the vehicle and a second side camera that photographs the right side of the vehicle.

If more than one camera is provided, the two or more cameras 134 may further include, in addition to the front camera, an interior camera for monitoring the interior of the vehicle.

An image sensor may also be provided or disposed in the interior of the vehicle. Specifically, the image sensor provided in the interior of the vehicle may include at least one of a camera and a LIDAR sensor and may transmit sensing information to the processor.

The obstacle detector 135 may detect the presence of obstacles around the vehicle and the location information of the obstacles.

The obstacle detector 135 may include one or more radar sensors.

The one or more radar sensors may obtain relative positions, relative distances, relative speeds, and the like of obstacles (e.g., other vehicles, pedestrians, cyclists, and the like) around the vehicle 1.

The one or more radar sensors may include a forward radar sensor to acquire radar information about the road ahead and a plurality of corner radar sensors to acquire radar information about the road to the left and right.

The obstacle detector 135 may include one or more LiDAR sensors.

The one or more LiDAR sensors may acquire information about the roadway, other vehicles, or atypical stationary objects in close proximity to the vehicle 1.

The one or more LiDAR sensors are non-contact distance detection sensors utilizing the principle of laser radar. The LiDAR sensor may include a transmitter that sends out a laser and a receiver that receives the laser as it bounces off the surface of an object present within the sensor's range.

In other words, a LIDAR sensor is a technology that uses laser signals to recognize objects around a vehicle. When a pulsed laser signal transmitted by the LiDAR sensor hits an object and returns the laser signal, a processor may analyze the returned laser signal to determine the object's position, direction of motion, speed, and the like.

The obstacle detector 135 may further include one or more ultrasonic sensors.

The one or more ultrasonic sensors generate ultrasonic waves for a period of time and then detect signals that are reflected back to the object.

The one or more ultrasonic sensors may be used to determine the presence or absence of obstacles, such as pedestrians, within a near-field range.

The first weight sensor 141 detects a weight applied to the axis of the front wheel Wf of the vehicle and outputs first weight information about the detected weight.

The first weight sensor 141 may be any one of a load cell, a pressure sensor, a weight sensor, or a strain gauge.

The second weight sensor 142 detects the weight applied to the axis of the rear wheel Wr of the vehicle and outputs second weight information about the detected weight.

The second weight sensor 142 may be any one of a load cell, a pressure sensor, a weight sensor, or a strain gauge. The second weight sensor 142 may be the same type of sensor as the first weight sensor 141.

The acceleration sensor 143 detects an acceleration of the vehicle 1.

The acceleration detected by the acceleration sensor 143 when the vehicle 1 is driving or accelerating may be the acceleration of the vehicle 1.

The acceleration detected by the acceleration sensor 143 when the vehicle 1 is braking may be the braking deceleration of the vehicle 1.

The acceleration sensor 143 may be a sensor utilizing any of the following operating principles: capacitive, piezoresistive, or thermal.

A gyro sensor or angular velocity sensor may be used instead of the acceleration sensor 143.

The speed sensor 144 detects the driving speed of the vehicle 1.

The speed sensor 144 may include a plurality of wheel speed sensors.

It is also possible to utilize an acceleration sensor 143 in place of the speed sensor 144.

The speed sensor 144 may include a plurality of wheel speed sensors and the acceleration sensor 143.

When the speed sensor 144 includes the acceleration sensor 143, the processor 162 may obtain an acceleration of the vehicle 1 based on the longitudinal acceleration information detected by the acceleration sensor 143. Further, the processor may also obtain a driving speed of the vehicle 1 based on the obtained acceleration.

When the speed sensor 144 includes the acceleration sensor 143 and the plurality of wheel speed sensors, the processor 162 may acquire the driving speed of the vehicle 1 based on the acceleration information detected by the acceleration sensor 143 and the wheel speed information acquired by the plurality of wheel speed sensors.

The braking system 150 may include a device that reduces the driving speed of the vehicle 1 or stops the vehicle 1.

The braking system 150 may reduce the driving speed of the vehicle 1 and/or cause the vehicle 1 to stop in response to brake pedal pressure information and control commands from the driver assistance device 160 in manual driving mode.

In autonomous driving mode, the braking system 150 may reduce the driving speed of the vehicle 1 at a deceleration rate in response to control commands from the processor 162.

The braking system 150 may further include an electronic brake control unit (not shown) for controlling the braking system in response to a driver's intent to brake via a brake pedal and/or slip of the wheels.

For example, the electronic brake control unit may temporarily disengage the brakes of the wheels in response to a slip of the wheels detected during braking of the vehicle 1 (Anti-lock Braking Systems (ABS)).

The electronic brake control unit may selectively release the brakes on a wheel in response to oversteering and/or understeering detected when steering the vehicle 1 (Electronic stability control (ESC)).

Further, the electronic stability control unit may temporarily apply the brakes in response to a slip of a wheel detected when the vehicle 1 is being driven (Traction Control System, (TCS)).

The vehicle 1 may further comprise a steering unit (not shown) that adjusts the direction of drive of the vehicle.

The steering device may adjust the driving direction of the vehicle 1 based on a steering angle of the steering wheel operated in response to a steering intent of the user in manual driving mode.

When in autonomous driving mode, the steering device may control the driving direction of the vehicle based on control instructions from the processor 162.

The above electronic components may communicate with each other via a vehicle communication network (NT). For example, the electronic components may send and receive data via Ethernet, MOST (Media Oriented Systems Transport), Flexray, MAY (Controller Area Network), LIN (Local Interconnect Network), etc.

The vehicle 1 may communicate with a server 2.

The server 2 may be a server at a service center, manufacturer, maintenance center, or the like that manages the vehicle 1. The server 2 may also include an application (i.e., app) server that provides services associated with the vehicle 1 and may include a telematics server or a platform server.

Large data sets may exist in various sizes and structures. Throughout the specification, big data refers to large data sets that are beyond the capability of traditional database management tools. In other words, big data refers to an accumulation of data that is too large and complex for processing, management, and storage by conventional databases and software applications to handle effectively.

The server 2 may collect big data and transmit the collected big data to the vehicle 1.

The big data may include route information and stop information for the vehicle 1.

The route information may include location information of the route per link of the route. The stop information may include identification information of the stop and location information of the stop.

The big data may include standing passenger information corresponding to the route information. The standing passenger information may include whether standing passengers are present and a number of standing passengers.

The big data may include a deceleration limit value in the event of a fall incident corresponding to the route information.

The driver assistance device 160 may provide various functions to the driver.

For example, the driver assistance device 160 may provide Lane Departure Warning (LDW), Lane Keeping Assist (LKA), High Beam Assist (HBA), Autonomous Emergency Braking (AEB), Traffic Sign Recognition (TSR), Smart Cruise Control (SCC), Blind Spot Detection (BSD), etc.

The driver assistance device 160 may perform a collision avoidance mode to prevent collisions with obstacles while driving.

The driver assistance device 160 may perform a self-driving mode that allows the vehicle to automatically drive or be driven to a destination by recognizing the road environment, by determining obstacles and driving conditions, and by controlling the vehicle's driving according to a planned driving path while avoiding obstacles.

The driver assistance device 160 may include a communicator 161, a processor 162, and a memory 163.

The communicator 161 may include one or more components that enable communication between devices within the vehicle and communication between the vehicle 1 and an external device, such as at least one of a near field communication module, a wired communication module, and a wireless communication module. In this example, the external device may be a server 2.

The near-field communication module may include various near-field communication modules that transmit and receive signals using a wireless communication network at a short distance, such as a Bluetooth module, an infrared communication module, a radio frequency identification (RFID) communication module, a wireless local access network (WLAN) communication module, an NFC communication module, a Zigbee communication module, and the like.

Wired communication modules may include various wired communication modules, such as Controller Area Network (MAY) communication modules, Local Area Network (LAN) modules, Wide Area Network (WAN) modules, or Value Added Network (VAN) modules, as well as various cable communication modules, such as Universal Serial Bus (USB), High Definition Multimedia Interface (HDMI), Digital Visual Interface (DVI), RS-232 (recommended standard232), power line communication, or plain old telephone service (POTS).

Wireless communication modules may include wireless communication modules that support various wireless communication methods, such as global System for Mobile Communication (GSM), code division multiple access (CDMA), wideband code division multiple access (WCDMA), universal mobile telecommunications system (UMTS), time division multiple access (TDMA), and long term evolution (LTE), in addition to Wi-Fi modules and wireless broadband modules.

The communicator 161 may communicate information detected by the various sensors to the processor 162.

The communicator 161 may relay control commands from the processor 162 to the braking system and various other devices.

The communicator 161 may further include a location receiver. The location receiver receives location information corresponding to the current location of the vehicle.

Such a location receiver may include a global positioning system (GPS) receiver. The global positioning system (GPS) receiver includes an antenna module for receiving signals from a plurality of GPS satellites and a signal processing unit.

The processor 162 may include a signal processor coupled with the memory 163. The memory 163 may store software that, when executed by the signal processor, causes the signal processor to acquire the current location using distance and time information corresponding to the location signals of the plurality of GPS satellites. The signal processor may further include a transmitter that transmits the acquired vehicle location information.

The processor 162 may include an image signal processor for processing image information from the camera 134. The processor 162 may further include one or more digital signal processors for processing radar information from the one or more radar sensors, laser information from the one or more LiDAR sensors, and/or ultrasonic information from the one or more ultrasonic sensors.

When in autonomous driving mode, the processor 162 may recognize lanes of the roadway based on the image data acquired by the camera 134, recognize position information and shape information (solid line, centerline, dashed line, and the like) of the recognized lanes, and recognize other vehicles driving in front of the vehicle 1 based on the image data acquired by the camera 134.

The processor 162 may recognize the lane in which the vehicle 1 is driving or being driven based on the location information of the recognized lane. The processor 162 may further control the driving of the vehicle 1 to follow another vehicle while maintaining a certain distance from the other vehicle in front of the vehicle 1 driving or being driven in the recognized lane.

The processor 162 may recognize lanes of the roadway, grades, i.e., steepness, of the roadway, and obstacles in front of the vehicle 1 (e.g., other vehicles, pedestrians, cyclists, curbs, guardrails, street trees, streetlights, and the like) based on video information, radar information, LiDAR information, and ultrasonic information.

Specifically, the processor 162 may obtain location information (distance and direction) and speed information (relative speed) of obstacles in front of vehicle 1 based on at least one of radar information, LiDAR information, and ultrasonic information.

The processor 162 may obtain location information (direction) and type information (e.g., whether the obstacle is another vehicle, or a pedestrian, or a cyclist, or a curb, or a guardrail, or a street tree, or a streetlight, or the like) of the obstacles in front of the vehicle 1 based on the image information. The processor 162 may further obtain location information of the lanes of the roadway.

Based on the image information from the camera 134 and the obstacle detection information from the obstacle detector 135, the processor 162 may obtain the type information, location information, and speed information of the obstacles. The processor 162 may further generate a braking signal or a steering signal based on the type information, location information, and speed information of the obstacles obtained.

More specifically, the processor 162 may calculate a time to collision (TTC) between the vehicle 1 and the obstacles ahead of the vehicle 1 based on the position information (relative distance) and the speed information (relative speed) of the obstacles ahead. The processor 162 may alert the driver that a collision may occur, send a braking signal to the braking system 150, and/or send a steering signal to the steering device based on a comparison result between the time to collision and a predetermined reference time.

The processor 162 may transmit the steering signal to the steering device based on the directional information of the location information of the obstacles ahead.

In another example, the processor 162 may calculate a Distance to Collision (DTC) based on speed information (i.e., relative speed) of the obstacles ahead. The processor 162 may alert the driver that a collision may occur or send a braking signal to the braking system 150 based on the comparison between the Distance to Collision and the distance to the obstacles ahead.

The processor 162 may obtain position information (distance and direction) and speed information (relative speed) of obstacles on the sides of the vehicle 1 (front right, front left, rear right, rear left) based on corner radar information from a plurality of corner radar sensors among the radar sensors or laser information from a plurality of corner LiDAR sensors among the LiDAR sensors.

When in autonomous driving mode, the processor 162 may control an output including stop guidance messages for the current stop and the next stop based on the identification information of the current stop determined based on the route information and the current location information.

The controlling of the output including the stop guidance messages by the processor 162 may include controlling the display 132 and the speaker 133.

When in autonomous driving mode, the processor 162 may control autonomous driving based on the route information, control stopping of the vehicle based on the location information of the stop, and control driving after the passenger alighting, i.e., passenger disembarkation, and the passenger boarding are completed.

The processor 162 may utilize an interior camera provided inside the vehicle 1 to monitor the interior environment and interior passengers.

Based on the information monitored by the interior cameras, the processor 162 may determine the number of passengers, the presence of standing passengers, and the number of standing passengers.

The processor 162 may obtain a weight value of the passengers in the vehicle 1 based on the first weight information received from the first weight sensor 141 and the second weight information received from the second weight sensor 142. The processor 162 may further obtain a total weight value by summing the weight value of the passengers and the pre-stored weight value of the vehicle.

The processor 162 may determine the value of the reference center of gravity corresponding to the total weight value based on the information stored in the memory 163.

The processor 162 may determine whether the vehicle 1 is in a braking state, i.e., the vehicle 1 activates the braking system 150, during autonomous driving. If the vehicle 1 is in a braking state, the processor 162 may determine a deceleration value detected by the acceleration sensor 143.

If the processor 162 determines that braking is required during autonomous driving, the processor 162 may obtain the braking force Bf of the front wheel and the braking force Br of the rear wheel required for braking. The processor 162 may control the braking based on the obtained braking force Bf of the front wheel and the braking force Br of the rear wheel.

The processor 162 may obtain a dynamic weight value (Wf) of the front wheel applied during braking based on the braking force (Bf) of the front wheel. The processor 162 may obtain a dynamic weight value (Wr) of the rear wheel applied during braking based on the braking force (Br) of the rear wheel.

The dynamic weight value (Wr) of the rear wheel may be the weight value (Wr) of the rear wheel.

The dynamic weight value Wf of the front wheel may be the weight value Wf of the front wheel.

The processor 162 may use an inter-axle distance (distance of the wheelbase, l) stored in the memory 163, a total weight value (W), an acquired front wheel weight value (Wf), and an acquired rear wheel weight value (Wr), the weight value (Wfs) of the front wheel detected by the first weight sensor 141, the weight value (Wrs) of the rear wheel detected by the second weight sensor 142, the deceleration value (a) detected by the acceleration sensor 143, and the gravity acceleration value (g) to obtain the value (CGH, h) of the center of gravity point.

$$B_f = \mu W_f = \frac{a}{g}\left(W_{fs} + W \cdot \frac{a}{g} \cdot \frac{h}{l}\right)$$

-continued $$B_r = \mu W_r = \frac{a}{g}\left(W_{rs} - W \cdot \frac{a}{g} \cdot \frac{h}{l}\right)$$

$$W_f = W_{fs} + W \cdot \frac{a}{g} \cdot \frac{h}{l}, \quad W_r = W_{rs} - W \cdot \frac{a}{g} \cdot \frac{h}{l}$$

In other words, the processor 162 may obtain a value of the center of gravity based on the first weight information received from the first weight sensor 141 and the second weight information received from the second weight sensor 142 when it is determined that the vehicle is in a braking state.

The processor 162 compares the value of the acquired center of gravity with the value of the reference center of gravity to obtain a difference value of the center of gravity.

The difference value between the obtained center of gravity value and the reference center of gravity value may be an error value.

The processor 162 may correct the error value based on the deceleration value a and the first factor determined at the time of braking.

As shown in FIG. 4, the first factor may be a correction ratio corresponding to the deceleration value.

Specifically, the processor 162 may determine a correction ratio corresponding to the deceleration value determined at the time of braking and correct the error value with the determined correction ratio.

As shown in FIG. 5, when the total weight value of the vehicle 1 is increased from 10000 kg (see the upper graph) to 1.5 t (=1500 kg) (see the lower graph), and braking is performed with a deceleration value of 0.01 g to 0.3 g, the weight value of the axle of the front wheel before and after the weight increase of 1.5 t differs by 78 kg, the weight value of the axle of the rear wheel differs by 78 kg, and the value of the center of gravity point (CGH) increases from 1.3 m (see the upper graph) to 1.41 m (seethe lower graph).

As shown in FIG. 6, when the total weight of the vehicle is increased by 5 t (=5000 kg) from 13500 kg, and braking is performed at a deceleration of 0.01 g to 0.3 g, the weight value of the axle of the front wheel before and after the weight increase by 5 t is different by 250 kg, the weight value of the axle of the rear wheel is different by 250 kg, and the value of the center of gravity (CGH) is increased from about 1.3 m (see the upper graph) to 1.56 m (see the lower graph).

As shown in FIGS. 5 and 6, since the value of the center of gravity does not change in proportion to the value of the total weight change of the vehicle, the processor 162 may use the first factor obtained through the test to correct the error value of the center of gravity.

The processor 162 may set a reference error range for the error value based on the deceleration calculation delay, the resolution of the first and second weight sensors, and the condition of the road surface.

The processor 162 may sum the preset error value with the tolerance value to obtain a reference error value and set the reference error range d from the preset error value to the reference value.

As shown in FIG. 7, the processor 162 may determine that a standing hazard does not exist if the corrected error value a1 at the time of braking is within the reference error range. The processor 162 may determine that a standing hazard exists if the corrected error value a2 at the time of braking is outside the reference error range.

The processor 162 may determine that a standing hazard exists if the corrected error value at the time of braking is greater than the reference error value.

In this example, the corrected error value being greater than the reference error value means that the number of standing passengers is greater than a reference number of passengers.

When the processor 162 determines that an occupancy risk exists, the processor 162 may determine a risk level corresponding to the corrected error value.

As shown in FIG. 8, a risk of 0% is indicative that the corrected error value is below the reference error value, and a risk of 100% is indicative that the corrected error value is above the preset maximum error value.

In other words, the risk level corresponding to the error value may be obtained by testing in advance.

The processor 162 determines a deceleration limit value corresponding to the determined risk.

The processor 162 may determine a second factor corresponding to the determined risk. The processor 162 may determine a deceleration limit value based on the maximum deceleration limit value and the determined second factor.

As shown in FIG. 9, the deceleration limit value B corresponding to the risk level and the second factor for determining the risk of an accident involving a standing passenger may be obtained by testing and using accident information previously stored in the memory.

The second factor may include information established by the maximum deceleration value obtained in an accident involving a standing passenger.

The processor 162 may control the vehicle with unrestricted deceleration when the risk is 0% or less, i.e., the processor 162 performs unrestricted deceleration when the risk is 0% or less.

When the risk exceeds 0%, the processor 162 may determine a deceleration limit corresponding to the risk and control the vehicle based on the determined deceleration limit.

The closer the risk is to 0%, the smaller the intervention of the deceleration limit, which may result in braking with a larger deceleration. The closer the risk is to 100%, the larger the intervention of the deceleration limit, which may result in braking with a smaller deceleration.

The processor 162 checks the rate of change of the corrected error value using the preset time as the unit time.

The processor 162 compares the identified rate of change to a reference rate of change range. The processor 162 determines that a potential for a fall accident exists if the identified rate of change is outside the reference rate of change range.

As shown in FIG. 10, the processor 162 may sum the preset change rate and the allowable change rate to obtain a reference change rate. The processor 162 may further set a change rate from the preset change rate to the reference change rate as a reference change rate range e.

In this example, the preset change rate, the allowable change rate, the reference change rate, and the reference change rate range may be previously stored information in the memory.

The preset rate of change may be a range of rates of change by which the corrected error value of the center of gravity changes per unit time when no standing passengers are present in the vehicle.

As shown in FIG. 10, when the processor 162 determines that the rate of change of the corrected error value is outside of the reference rate of change range e, the processor 162 determines that a potential for a roll-over accident exists and controls the vehicle 1 by stopping the vehicle 1 or causing the vehicle 1 to stop.

If the processor 162 determines that the rate of change a2 of the corrected error value is greater than the reference rate of change, the processor 162 determines that the possibility of a falling accident exists and controls the vehicle 1 by stopping the vehicle 1 or causing the vehicle 1 to stop.

When controlling the deceleration, the processor 162 may determine that a possibility of a dangerous situation occurring by the deceleration of the vehicle exists if it is determined that the slope of the deceleration of the deceleration limit value corresponding to the risk level is greater than or equal to a preset slope.

As shown in FIG. 11, the processor 162 may perform deceleration of the vehicle 1 based on the received maximum deceleration limit value c1 when the maximum deceleration limit value c1 is received from the electronic brake control unit (not shown) within a preset time c3 at the time of deceleration control.

The processor 162 may control the deceleration of the vehicle 1 based on the received maximum deceleration limit value c1 to maintain the same braking distance as when the deceleration was performed with the preset maximum deceleration limit value c2.

As shown in FIG. 12A, the processor 162 may control the deceleration of the vehicle based on the preset maximum deceleration limit value d1 when it is determined that the maximum deceleration limit value transmitted from the electronic brake control unit (not shown) is less than the preset maximum deceleration limit value.

As shown in FIG. 12B, the processor 162 may control the deceleration of the vehicle based on the determined deceleration limit value d2 when the emergency braking command is received.

As shown in FIG. 13, the processor 162 may perform a deceleration of the vehicle based on a minimum deceleration limit value. The processor 162 may then control the vehicle by causing the vehicle to stop if the processor 162 determines that a rollover incident has occurred.

The processor 162 may monitor the interior of the vehicle using interior cameras provided in the interior of the vehicle and determine the condition of the passengers based on the monitoring information.

If the processor 162 determines that a fallen passenger is present based on the passenger's condition information, the processor 162 may determine a safe evacuation location based on map information, current location information, and video information from the camera, and perform deceleration and guidance of the vehicle to the identified evacuation location. The processor 162 may then cause or control the vehicle to stop after determining that the evacuation location is reached.

The processor 162 may determine whether an injured passenger exists based on the passenger's status information. The processor 162 may cause the vehicle to continue in autonomous driving mode if the processor 162 determines that an injured passenger does not exist. The processor 162 may cause the vehicle to stop or exit autonomous driving mode and transmit accident information and current location information of the vehicle 1 to the server 2 or to an emergency medical center if the processor 162 determines that an injured passenger exists.

The processor 162 may regain control of autonomous driving when no-accident information is received via the input 111.

The processor 162 may transmit the location information of the incident of the fall, the number of passengers that are standing, the value of the center of gravity, and the value of the deceleration limit to the server 2.

Based on the big data received from the server 2, the processor 162 may update the values of the reference center of gravity that correspond to the total weight values of the vehicle, the first factor that correspond to the deceleration values, the safety degrees that correspond to the error values of the center of gravity, and the second factor that correspond to the safety degrees.

The processor 162 may update the reference error range and the reference rate of change range based on the big data received from the server 2.

The processor 162 may update the baseline error value, the tolerance value, the baseline rate of change, and the allowable rate of change based on the big data received from the server 2.

The processor 162 may be a processor of the driver assistance system (ADAS) 160. In this case, the driver assistance system 160 may include a communicator 161, a processor 162, and a memory 163.

The processor 162 may include a memory (not shown) that stores data for an algorithm or a program including computer executable instructions that reproduces an algorithm for implementing actions of the driver assistance device 160 and a processor (not shown) that performs the aforementioned actions using the data stored in the memory. In other words, the memory may store computer-executable instructions executable by the processor to cause the processor to perform the aforementioned actions.

The processor 162 may be any of the processors provided in the vehicle 1. In this case, the processor 162 may include a memory (not shown) storing data for an algorithm or a program reproducing the algorithm for implementing the operation of the vehicle 1 and a processor (not shown) for performing the aforementioned operations using the data stored in the memory. In other words, the memory may store computer-executable instructions executable by the processor to cause the processor to perform the aforementioned operations.

The memory 163 may store a value of a reference center of gravity point by total weight. The memory 163 may further store a maximum value of the center of gravity.

The total weight may include a weight value of the vehicle plus a weight value of one or more passengers.

The memory 163 may store a first table of values of the reference center of gravity by total weight of the vehicle.

The memory 163 may store a preset error value, a tolerance value, and a reference error range.

The memory 163 may store a risk level corresponding to the error value of the center of gravity.

The memory 163 may store a weight value of the vehicle, an inter-axle distance value, and a gravitational acceleration value.

The memory 163 may store information about the first factor and the second factor.

The memory 163 may store the first factor corresponding to the deceleration value in a second table.

The memory 163 may store the second factor corresponding to each of the safety degrees in a third table.

The memory 163 may store a fourth table of safety factors corresponding to each of the center of gravity error values.

The memory 163 may store map information and route information. The memory 163 may store identification information of stops and location information of stops. The route information may include location information for each link of the route.

The map information includes road information necessary for a vehicle to drive.

The map information may include map information that is represented at least 10 times more precisely than conventional maps. The map information may further include a precision map with an approximate error of 10 to 20 centimeters or less between the actual road information and the road information in the map information.

For example, the precision map may include map information that includes an error of about 10 to 20 centimeters or less between the location of lanes, branches, junctions, types of road installations, buildings, locations of installations, locations of buildings on the actual road and the location of lanes, branches, junctions, types of road installations, buildings, locations of installations, and locations of buildings on the map.

The memory 163 may store programs, data, and/or computer-executable instructions executable by the processor 162 to cause the processor 162 to process image information, radar information, LiDAR information, and/or ultrasonic information. The computer executable instructions may further cause the processor 162 to generate braking signals and/or steering signals.

The memory 163 may be implemented as at least one of, but not limited to, a cache, a non-volatile memory device such as read only memory (ROM), programmable ROM (PROM), erasable programmable ROM (EPROM), electrically erasable programmable ROM (EEPROM), and flash memory, a volatile memory device such as random access memory (RAM), or a storage medium such as a hard disk drive (HDD), CD-ROM.

The memory 163 may be a memory implemented on a separate chip from the processor described above with respect to the processor 162, or the memory 163 may be implemented on a single chip with the processor 162.

In addition, each of the components illustrated in FIG. 3 refers to hardware components such as microprocessors, specifically configured processors, field programmable gate arrays (FPGAs) and application specific integrated circuits (ASICs). Each of the hardware components may be configured to execute the software/computer-executable instructions stored in the memory 163.

FIG. 14 is a control flowchart of a vehicle according to an embodiment.

The vehicle may control the autonomous driving based on route information. The vehicle may identify the identification information of the current stop based on the route information and the current location information during autonomous driving. The vehicle may output the stop guidance message for the current stop and the next stop via the display 132 and the speaker 133 based on the identified identification information of the current stop.

The vehicle controls the stopping of the vehicle based on the location information of the stop. The vehicle may drive or be driven when the disembarkation of the passengers and the boarding of the passengers are completed.

The vehicle may monitor the interior environment and the passengers of the vehicle using an interior camera provided inside the vehicle.

Based on the information monitored by the interior camera, the vehicle may determine the number of passengers, determine the presence of standing passengers among the passengers, and determine the number of standing passengers.

The vehicle may obtain a weight value of the passengers in the vehicle based on the first weight information received from the first weight sensor 141 and the second weight information received from the second weight sensor 142. The vehicle may obtain a total weight value by summing the weight value of the passengers and the pre-stored weight value of the vehicle.

The vehicle may determine the value of the reference center of gravity corresponding to the total weight value based on the information stored in the memory 163.

The vehicle determines whether braking is required based on the obstacle information and the driving speed information. If the vehicle determines that braking is required, the vehicle performs braking (Block 171), but checks the deceleration value detected by the acceleration sensor 143 at the time of braking.

When the vehicle determines that braking is required during autonomous driving, the vehicle may obtain the braking force Bf of the front wheel and the braking force Br of the rear wheel required for braking. Further, the vehicle may control the braking based on the obtained braking force Bf of the front wheel and the braking force Br of the rear wheel.

The vehicle may obtain a dynamic weight value (Wf) of the front wheel applied during braking based on the braking force (Bf) of the front wheel. The vehicle may obtain a dynamic weight value (Wr) of the rear wheel applied during braking based on the braking force (Br) of the rear wheel (Block 172).

The dynamic weight value (Wr) of the rear wheel may be a weight value (Wr) of the rear wheel.

The dynamic weight value Wf of the front wheel may be the weight value Wf of the front wheel.

The vehicle determines an inter-axle distance (distance of the wheelbase, I) stored in the memory 163, a total weight value (W), an acquired front wheel weight value (Wf), and an acquired rear wheel weight value (Wr), a weight value (Wfs) of the front wheel detected by the first weight sensor 141, a weight value (Wrs) of the rear wheel detected by the second weight sensor 142, a deceleration value (a) detected by the acceleration sensor 143, and a gravity acceleration value (g) to obtain a value (CGH, h) of the center of gravity.

When the vehicle is determined to be in a braking state, the vehicle may obtain a value of the center of gravity based on the first weight information received from the first weight sensor 141 and the second weight information received from the second weight sensor 142.

The vehicle compares the value of the acquired center of gravity with the value of the reference center of gravity to obtain a difference value of the center of gravity (Block 173). The difference value between the obtained center of gravity value and the reference center of gravity value may be an error value.

The vehicle may correct the error value based on the deceleration value (a) and a first factor determined at the time of braking (Block 174).

The first factor may include a correction ratio corresponding to the deceleration value. In other words, the vehicle may determine a correction ratio corresponding to the deceleration value determined at the time of braking and correct the error value with the determined correction ratio.

The vehicle may set a reference error range for the error value, based on the deceleration calculation delay, the resolution of the first and second weight sensors, and the condition of the road surface.

The vehicle may obtain the reference error value by summing the preset error value and the tolerance value.

Further, the vehicle may set the reference error range from the preset error value to the reference value.

The vehicle may determine whether the corrected error value is outside the reference error range at the time of braking (Block 175).

If the corrected error value is within the reference error range at the time of braking, the vehicle determines that a standing hazard does not exist and does not apply the deceleration limit value to the vehicle's deceleration (Block 176).

On the other hand, the vehicle may determine that a standing hazard exists if the corrected error value at the time of braking is determined to be outside the reference error range.

The vehicle may also determine that a standing hazard exists if the corrected error value at the time of braking is greater than the reference error value. In this case, the corrected error value being greater than the reference error value means that the number of passengers in the standing state is greater than the reference number of passengers.

Once the vehicle determines that a standing risk exists, the vehicle may obtain a risk and rate of change for standing (Block 177).

The vehicle determines the rate of change of the corrected error value based on a unit time. The unit time may be a preset time.

The vehicle determines if the obtained rate of change is outside of a reference rate of change range (Block 178).

The baseline rate of change range may be from the preset rate of change to the baseline rate of change. The reference rate of change is the sum of the preset rate of change and the allowable rate of change.

The preset rate of change may be a range of rates of change by which the corrected error value of the center of gravity changes per unit of time when no standing passengers are present in the vehicle.

The preset rate of change, the allowable rate of change, the reference rate of change, and the range of reference rates of change may be pre-stored information in the memory.

If the vehicle determines that the acquired rate of change does not exceed the baseline rate of change range, the vehicle may determine that a fall event is not possible.

The vehicle may determine a second factor corresponding to the determined risk. The vehicle may obtain a deceleration limit value based on the maximum deceleration limit value and the determined second factor (Block 179).

The deceleration limit value corresponding to the risk level and the second factor for determining the risk level may be obtained by testing vehicle data stored in advance. The second factor may be information set by the maximum deceleration value obtained in the event of an accident for a standing passenger.

A risk of 0% indicates that the corrected error value is below the reference error value, and a risk of 100% indicates that the corrected error value is above the preset maximum error value.

The vehicle may control the vehicle without limitation of deceleration when the risk is 0% or less.

When the risk exceeds 0%, the vehicle may obtain a deceleration limit value corresponding to the risk and the vehicle may control the deceleration of the vehicle based on the obtained deceleration limit value (Block 180).

If the vehicle determines that the rate of change of the corrected error value is outside the range of the reference rate of change, the vehicle determines that a possibility of a fall accident exists (Block 181) and controls the stopping of the vehicle (Block 182).

If the vehicle determines that the rate of change of the corrected error value is greater than the reference rate of change, the vehicle may also determine that a possibility of a fall accident exists and control the vehicle to stop.

If the vehicle determines that a fall accident has occurred based on the video information acquired by the interior camera, the vehicle may decelerate to the minimum deceleration limit and control the vehicle to stop.

The vehicle may monitor the interior of the vehicle using an interior camera provided in the interior of the vehicle and determine the status of the passenger based on the monitoring information (Block 183).

If the vehicle determines that a fallen passenger is present based on the status information of the passenger, the vehicle may determine a safe evacuation location based on the map information, the current location information, and the video information from the camera. The vehicle may further perform a deceleration to the determined evacuation location. The vehicle may control the stop when the vehicle determines that the evacuation location is reached.

The vehicle may determine whether an injured passenger exists based on the status information of the passenger. The vehicle may control autonomous driving if it is determined that an injured passenger does not exist. The vehicle may stop autonomous driving and transmit accident information and current location information of the vehicle to the server 2 or an emergency medical center if the vehicle determines that an injured passenger exists.

The vehicle may regain control of autonomous driving when no-accident information is received via the input 111.

The vehicle may transmit the location information where the fall occurred, the number of standing passengers, the value of the center of gravity, and the deceleration limit value to the server 2.

One of ordinary skill in the art should appreciate that one or more actions and/or operations described herein may be implemented using, among other things, a tangible computer-readable medium comprising computer-executable instructions (e.g., executable software code) executable by a processor. Alternatively, the actions and/or operations may be implemented as software code, firmware code, specifically configured hardware or processors, and/or a combination of the aforementioned. For example, the vehicle may include a processor specifically configured or otherwise, that controls the overall operation of the vehicle.

In an alternative embodiment, dedicated or otherwise specifically configured hardware implementations, such as application specific integrated circuits, programmable logic arrays and other hardware devices such as specifically configured hardware or processors, can be constructed to implement one or more of the methods described herein.

In one aspect, the disclosed embodiments may be implemented in the form of a recording medium storing instructions executable by a computer. The instructions may be stored in the form of program code, which, when executed by a processor, may generate program modules to perform the operations of the disclosed embodiments. The recording medium may be implemented as a computer-readable recording medium.

A computer-readable recording medium includes any type of recording medium on which instructions that may be decoded by a computer are stored. For example, read only memory (ROM), random access memory (RAM), magnetic tape, magnetic disk, flash memory, optical data storage, and the like.

The disclosed embodiments may improve the safety of standing passengers in an autonomously driving vehicle.

The disclosed embodiments may stably decelerate the vehicle by controlling a limit value of the deceleration using the height of the center of gravity and the rate of change of the height as the number of standing passengers increases.

The disclosed embodiments may easily obtain big data because it collects information about the presence and number of standing passengers by location and time from buses that repeatedly drive a predetermined route.

In addition, even if a fall accident of many standing passengers occurs in an unavoidable situation, the disclosed embodiments may prevent secondary accidents because the disclosed embodiments may safely cause the vehicle to drive to a safe place and to stop when the disclosed embodiments recognize the foregoing accident. Further, the disclosed embodiments may monitor the situation of the fall accident and report the accident situation.

The disclosed embodiments may improve the safety of the bus using only software without adding an additional separate hardware device, thus preventing an increase in the manufacturing cost.

Therefore, the disclosed embodiments may improve the quality and productivity of autonomous vehicles and further increase user satisfaction, improve user convenience, vehicle safety, and secure product competitiveness.

The disclosed embodiments have been described above with reference to the accompanying drawings. One of ordinary skill in the art would understand that the different embodiments may be practiced in other forms than the disclosed embodiments without altering the technical ideas or essential features of the embodiment. The disclosed embodiments provide different examples and should not be construed as limiting.

What is claimed is:

1. An advanced driver assistance system comprising:
   a memory configured to store a weight value of a vehicle and an inter-axle distance value of the vehicle; and
   a processor coupled with the memory, wherein the processor is configured to
      implement a communicator configured to receive a first weight value of a front wheel axle of the vehicle, a second weight value of a rear wheel axle of the vehicle, and a deceleration value of the vehicle,
      obtain a value of a center of gravity point based on the stored weight value of the vehicle, the inter-axle distance value of the vehicle, the received first weight value, the received second weight value, the received deceleration value, and a preset gravitational acceleration value,
      determine whether a standing passenger exists in the vehicle based on the obtained value of the center of gravity point, and
      control a deceleration of the vehicle based on the determination that the standing passenger exists.

2. The advanced driver assistance system according to claim 1,
   wherein the memory stores values of a reference center of gravity point respectively corresponding to total weight values of the vehicle in a first table, and
   wherein the processor
      obtains a total weight value of the vehicle based on the received first weight value, the received second weight value, and the stored weight value of the vehicle,
      determines a value of the stored values of the reference center of gravity in the first table corresponding to the obtained total weight value of the vehicle, and
      determines whether the standing passenger exists in the vehicle based on a difference between the determined value of the stored values of the reference center of gravity and the obtained value of the center of gravity.

3. The advanced driver assistance system according to claim 2,
   wherein the processor determines an error value between the determined value of the stored values of the reference center of gravity point and the obtained value of the center of gravity point and determines that the standing passenger exists in the vehicle upon determining that the error value is within a reference error range.

4. The advanced driver assistance system according to claim 3,
   wherein the received deceleration value is one of a plurality of deceleration values,
   wherein the memory stores a plurality of first factors corresponding to each of the plurality of deceleration values in a second table, and
   wherein the processor confirms a first factor of the plurality of first factors corresponding to the received deceleration value from the second table and corrects the determined error value based on the confirmed first factor.

5. The advanced driver assistance system according to claim 3,
   wherein the determined error value is one of a plurality of error values of the center of gravity,
   wherein the memory stores a plurality of safety degrees corresponding to each of the plurality of error values of the center of gravity in a third table and stores a plurality of second factors corresponding to the plurality of safety degrees in a fourth table, and
   wherein the processor determines a safety degree of the plurality of safety degrees corresponding to the determined error value from the third table, confirms a second factor of the plurality of second factors corresponding to the determined safety degree from the fourth table, obtains a deceleration limit value based on the confirmed second factor and a predetermined maximum deceleration limit value, and controls the deceleration of the vehicle based on the obtained deceleration limit value.

6. The advanced driver assistance system according to claim 3,
   wherein the processor obtains a change rate at which the determined error value changes over a preset time period and determines a probability of occurrence of a fall accident by comparing the obtained change rate with a reference change rate range.

7. The advanced driver assistance system according to claim 6,
   wherein the processor determines that the probability of occurrence of the fall accident exists when the obtained change rate is out of the reference change rate range and causes the vehicle to stop.

8. The advanced driver assistance system according to claim 7, wherein the processor controls the communicator to transmit the obtained deceleration limit value and the determined error value of the center of gravity to a server coupled with the processor when it is determined that the probability of occurrence of the fall accident exists.

9. The advanced driver assistance system according to claim 7, wherein the processor controls the communicator to receive sensing information from an image sensing unit provided in the vehicle, and wherein the processor determines whether the fall accident has occurred based on the sensing information.

10. A vehicle comprising:
a front wheel and a rear wheel of the vehicle;
a first weight sensor configured to detect an axle weight of the front wheel;
a second weight sensor configured to detect an axle weight of the rear wheel;
an acceleration sensor configured to detect an acceleration rate;
a memory configured to store a weight value of the vehicle and an inter-axle distance value of the vehicle;
a processor configured to
control driving of the vehicle,
obtain a value of a center of gravity point based on the stored weight value of the vehicle, an inter-axle distance value, a first weight value detected by the first weight sensor, a second weight value detected by the second weight sensor, a deceleration value detected by the acceleration sensor, and a predetermined gravitational acceleration value when braking during driving,
determine whether a standing passenger exists in the vehicle based on the obtained value of the center of gravity point, and
control the deceleration based on the obtained value of the center of gravity point and on the determination that the standing passenger exists; and
a braking device configured to perform braking in response to a control command of the processor.

11. The vehicle according to claim 10,
wherein the memory stores values of a reference center of gravity point corresponding to total weight values of the vehicle in a first table, and
wherein the processor
obtains a total weight value of the vehicle based on the received first weight value, the received second weight value, and the stored weight value of the vehicle,
determines a value of the stored values of the reference center of gravity corresponding to the obtained total weight value of the vehicle stored in the first table, and
determines whether the standing passenger exists based on a difference between the determined value of the stored values of the reference center of gravity and the obtained value of the center of gravity.

12. The vehicle according to claim 11,
wherein the processor determines an error value between the determined value of the stored values of the reference center of gravity point and the obtained value of the center of gravity point, and determines that the standing passenger exists upon determining that the determined error value is within a reference error range.

13. The vehicle according to claim 12,
wherein the deceleration value is one of a plurality of deceleration values, wherein the memory stores a plurality of first factors corresponding to each of the plurality of deceleration values in a second table, and
wherein the processor confirms a first factor of the plurality of first factors corresponding to the received deceleration value from the second table and corrects the determined error value based on the confirmed first factor.

14. The vehicle according to claim 12,
wherein the determined error value is one of a plurality of error values of the center of gravity,
wherein the memory stores a plurality of safety degrees corresponding to each of the plurality of error values of the center of gravity in a third table and stores a plurality of second factors corresponding to the plurality of safety degrees in a fourth table, and
wherein the processor determines a safety degree of the plurality of safety degrees corresponding to the determined error value from the third table, confirms a second factor of the plurality of second factors corresponding to the determined safety degree from the fourth table, obtains a deceleration limit value based on the confirmed second factor and a predetermined maximum deceleration limit value, and controls the deceleration based on the obtained deceleration limit value.

15. The vehicle according to claim 12,
wherein the processor performs unconstrained deceleration of the vehicle if the determined error value is within the reference error range.

16. The vehicle according to claim 12,
wherein the processor obtains a change rate at which the determined error value changes over a preset time period and determines a probability of occurrence of a fall accident by comparing the obtained change rate with a reference change rate range.

17. The vehicle according to claim 16,
wherein the processor determines that the probability of occurrence of the fall accident exists when the obtained change rate is out of the reference change rate range and causes the vehicle to stop.

18. The vehicle according to claim 17, further comprising:
a communicator configured to communicate with a server coupled with the processor, wherein the processor controls the communicator to transmit the obtained deceleration limit value and the determined error value of the center of gravity to the server when it is determined that the probability of occurrence of the fall accident exists.

19. The vehicle according to claim 18,
wherein the processor updates the reference error range and the reference change rate range based on big data received from the server.

20. The vehicle according to claim 18, further comprising:
an image sensor arranged in an interior of the vehicle, wherein the communicator receives sensing information from the image sensor and the processor determines whether the fall accident has occurred based on the sensing information.

* * * * *